US011231726B2

United States Patent
Liu et al.

(10) Patent No.: US 11,231,726 B2
(45) Date of Patent: Jan. 25, 2022

(54) UAV HARDWARE ARCHITECTURE

(71) Applicant: SZ DJI TECHNOLOGY CO., LTD., Shenzhen (CN)

(72) Inventors: Huaiyu Liu, Shenzhen (CN); Hualiang Qiu, Shenzhen (CN); Jun Wu, Shenzhen (CN); Guyue Zhou, Shenzhen (CN); Jinzhu Huang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 99 days.

(21) Appl. No.: 16/114,852

(22) Filed: Aug. 28, 2018

(65) Prior Publication Data
US 2019/0004512 A1  Jan. 3, 2019

Related U.S. Application Data

(63) Continuation of application No. PCT/CN2016/074783, filed on Feb. 29, 2016.

(51) Int. Cl.
*G05D 1/10* (2006.01)
*B64C 39/02* (2006.01)
(Continued)

(52) U.S. Cl.
CPC ............ *G05D 1/106* (2019.05); *B64C 39/024* (2013.01); *G05D 1/0038* (2013.01);
(Continued)

(58) Field of Classification Search
None
See application file for complete search history.

(56) References Cited

U.S. PATENT DOCUMENTS 8,560,146 B2   10/2013  Kwon et al.
8,855,846 B2 * 10/2014  Grzywna ............... G05D 1/106
                                                       701/23
(Continued)

FOREIGN PATENT DOCUMENTS

CN   102915038 A   2/2013
CN   103853158 A   6/2014
(Continued)

OTHER PUBLICATIONS

Christophersen et al., "Small Adaptive Flight Control Systems for UAVs using FPGA/DSP Technology", presented at the AIAA 3rd Unmanned Unlimited Technical Conference, Workshop and Exhibit, Sep. 20-23, 2004, published by the American Institute of Aeronautics and Astronautics, Inc., 2004 (Year: 2004).*

(Continued)

*Primary Examiner* — Tamara L Weber
(74) *Attorney, Agent, or Firm* — Anova Law Group, PLLC

(57) ABSTRACT

An unmanned aerial vehicle (UAV) includes one or more propulsion units that effect flight of the UAV, an application processing circuit configured to verify a validity of a system image of the UAV in a secure environment, and a flight control circuit operably coupled to the application processing circuit. Generation and/or transmission of control signals from the flight control circuit to one or more electronic speed controllers (ESC controllers) is prevented prior to verification of the validity of the system image.

20 Claims, 12 Drawing Sheets

(51) Int. Cl.
*G05D 1/00* (2006.01)
*G06F 21/44* (2013.01)
*G06T 7/00* (2017.01)
*H04N 5/247* (2006.01)
*G06T 7/50* (2017.01)
*G06T 7/20* (2017.01)

(52) U.S. Cl.
CPC ......... *G05D 1/0055* (2013.01); *G05D 1/0088* (2013.01); *G05D 1/102* (2013.01); *G06F 21/44* (2013.01); *G06T 7/0002* (2013.01); *H04N 5/247* (2013.01); *B64C 2201/024* (2013.01); *B64C 2201/127* (2013.01); *B64C 2201/145* (2013.01); *B64C 2201/146* (2013.01); *G06T 7/20* (2013.01); *G06T 7/50* (2017.01); *G06T 2207/10032* (2013.01); *G06T 2207/30261* (2013.01)

(56) References Cited

U.S. PATENT DOCUMENTS

| | | | |
|---|---|---|---|
| 9,132,916 B2 | 9/2015 | Hanna et al. | |
| 9,164,506 B1 | 10/2015 | Zang | |
| 9,208,687 B2 | 12/2015 | Wang et al. | |
| 9,817,396 B1* | 11/2017 | Takayama | G05D 1/0038 |
| 2010/0145556 A1* | 6/2010 | Christenson | G06F 8/36 |
| | | | 701/15 |
| 2011/0035149 A1* | 2/2011 | McAndrew | G05D 1/0038 |
| | | | 701/466 |
| 2014/0380425 A1* | 12/2014 | Lockett | H04L 63/20 |
| | | | 726/4 |
| 2015/0346722 A1* | 12/2015 | Herz | G05D 1/0027 |
| | | | 701/2 |
| 2016/0244187 A1* | 8/2016 | Byers | B64C 39/024 |
| 2017/0323543 A1* | 11/2017 | Glaser | H04N 1/3232 |
| 2018/0157255 A1* | 6/2018 | Halverson | B64C 39/024 |
| 2018/0253092 A1* | 9/2018 | Trapero Esteban | G05D 1/0022 |

FOREIGN PATENT DOCUMENTS

| | | |
|---|---|---|
| CN | 103984357 A | 8/2014 |
| CN | 104809918 A | 7/2015 |
| CN | 104994112 A | 10/2015 |
| CN | 204808049 U | 11/2015 |
| CN | 105222760 A | 1/2016 |
| CN | 205265924 U | 5/2016 |
| CN | 106843273 A | 6/2017 |
| CN | 109983414 A | 7/2019 |
| WO | 2008097562 A1 | 8/2008 |
| WO | 2016026023 A1 | 2/2016 |

OTHER PUBLICATIONS

The World Intellectual Property Organization (WIPO) International Search Report and Written Opinion for PCT/CN2016/074783 dated Dec. 1, 2016 7 pages.

* cited by examiner

| Application processing module | Real-time sensing module | Flight control module | Function |
|---|---|---|---|
|  |  | + | Stable flight — 501 |
|  | + | + | Vision based hovering — 503 |
|  | + | + | Passive obstacle avoidance — 505 |
| + | + | + | Tracking — 507 |
| + |  | + | Waypoint flight — 509 |
| + |  | + | Tap and go — 511 |

UAV HARDWARE ARCHITECTURE

CROSS-REFERENCE TO RELATED APPLICATION

This application is a continuation of International Application No. PCT/CN2016/074783, filed on Feb. 29, 2016, the entire contents of which are incorporated herein by reference.

BACKGROUND

Aerial vehicles have a wide range of real-world applications including surveillance, reconnaissance, exploration, logistics transport, disaster relief, aerial photography, large-scale agriculture automation, live video broadcasting, etc. Increasingly, an aerial vehicle carrying a payload (e.g., a camera) may be required to be able to complete a broad variety of operations, both simple and complex. In addition, with the advancement of sensors and navigation technologies, autonomy of the aerial vehicles may increase. The usefulness of aerial vehicles may be improved with appropriate distribution and/or utilization of processors for given operations of the aerial vehicles.

SUMMARY

Presently, unmanned aerial vehicles (UAV) may utilize a flight control module to control flight of UAVs. The flight control module may comprise a plurality of micro-controllers and various sensors may be coupled to the flight control module. In some instances, the flight control module may inefficiently process input data (e.g., from various sensors) and functionalities of UAVs that may be achieved by existing flight control modules may be limited. The ability to implement advanced features for UAVs requiring heavy processing loads may be desired. In some instances, processing data may have different requirements and/or needs. For example, in some instances, real-time processing of input data may be required (e.g., for passive autonomous flight) while in some instances non-real time but extensive processing of input data may be required (e.g., for directed autonomous flight).

Accordingly, a need exists for a UAV hardware architecture that provides for a number of different processing modules. The different processing modules may be coupled to different types of sensors and/or devices. The differing processing modules may receive data from the different sensors and/or devices and be responsible for different processing requirements. The different processing modules may be responsible for implementing different features for the UAV. An appropriate distribution of processing modules and ability for a subset or combination of the modules to work together to implement features may enable new and improved UAV functionality.

Thus, in one aspect, a system for managing flight of an unmanned aerial vehicle (UAV) is provided. The system comprises: an application processing module configured to run an operating system; a real-time sensing module in communication with the application processing module, the real-time sensing module configured to process data in real time; and a flight control module in direct communication with the application processing module and the real-time sensing module, the flight control module further configured to control one or more propulsion units that effect flight of the UAV.

In another aspect, an unmanned aerial vehicle (UAV) is provided. The UAV comprises: one or more propulsion units that effect flight of the UAV; an application module configured to run an operating system; a real-time sensing module in communication with the application processing module, the real-time sensing module configured to process data in real time; and a flight control module in direct communication with the application processing module and the real-time sensing module, the flight control module further configured to control the one or more propulsion units.

In another aspect, a non-transitory computer readable medium for managing flight of an unmanned aerial vehicle (UAV) is provided. The non-transitory computer readable medium comprises code, logic, or instructions to: run an operating system with aid of an application module; process data in real time with aid of a real-time sensing module in communication with the application processing module; and effect flight of the UAV with aid of one or more propulsion units, the one or more propulsion units controlled by a flight control module in direct communication with the application processing module and the real-time sensing module.

In another aspect, a method for managing flight of an unmanned aerial vehicle (UAV) is provided. The method comprises: running an operating system with aid of an application module; processing data in real time with aid of a real-time sensing module in communication with the application processing module; and effecting flight of the UAV with aid of one or more propulsion units, the one or more propulsion units controlled by a flight control module in direct communication with the application processing module and the real-time sensing module.

In another aspect, a system for managing flight of an unmanned aerial vehicle (UAV) is provided. The system comprises: an application processing module configured to receive data from a first imaging sensor, wherein the first imaging sensor captures data according to instructions from a user; and a real-time sensing module configured to receive data from one or more other imaging sensors, wherein the one or more other imaging sensors captures data autonomously, and wherein data processed by the application processing module or the real-time sensing module is used to aid flight of the UAV.

In another aspect, an unmanned aerial vehicle (UAV) is provided. The UAV comprises: one or more propulsion units that effect flight of the UAV; an application processing module configured to receive data from a first imaging sensor, wherein the first imaging sensor captures data according to instructions from a user; and a real-time sensing module configured to receive data from one or more other imaging sensors, wherein the one or more other imaging sensor is configured to capture data autonomously, and wherein data processed by the application processing module or the real-time sensing module is used to aid flight of the UAV.

In another aspect, a non-transitory computer readable medium for managing flight of an unmanned aerial vehicle (UAV) is provided. The non-transitory computer readable medium comprises code, logic, or instructions to: receive data, at an application processing module, from a first imaging sensor, wherein the first imaging sensor captures data according to instructions from a user; and receive data, at a real-time sensing module, from one or more other imaging sensors, wherein the one or more other imaging sensors are configured to capture data autonomously, and wherein data processed by the application processing module or the real-time sensing module is used to aid flight of the UAV.

In another aspect, a method for managing flight of an unmanned aerial vehicle (UAV) is provided. The method comprises: receiving data, at an application processing module, from a first imaging sensor, wherein the first imaging sensor captures data according to instructions from a user; and receiving data, at a real-time sensing module, from one or more other imaging sensors, wherein the one or more other imaging sensors are configured to capture data autonomously, and wherein data processed by the application processing module or the real-time sensing module is used to aid flight of the UAV.

In another aspect, a system for managing flight of an unmanned aerial vehicle (UAV) is provided. The system comprises: an application processing module configured to verify a validity of a system image of the system in a secure environment; and a flight control module operably coupled to the application processing module, wherein generation and/or transmission of control signals from the flight control module to one or more ESC controllers is prevented prior to verification of the validity of the system image.

In another aspect, an unmanned aerial vehicle (UAV) is provided. The UAV comprises: one or more propulsion units that effect flight of the UAV; an application processing module configured to verify a validity of a system image of the system in a secure environment; and a flight control module operably coupled to the application processing module, wherein generation and/or transmission of control signals from the flight control module to one or more ESC controllers is prevented prior to verification of the validity of the system image.

In another aspect, a non-transitory computer readable medium for managing flight of an unmanned aerial vehicle (UAV) is provided. The non-transitory computer readable medium comprises code, logic, or instructions to: verify, at an application processing module, a validity of a system image of the system in a secure environment; and prevent, at a flight control module operably coupled to the application processing module, generation and/or transmission of control signals from the flight control module to one or more ESC controllers prior to verification of the validity of the system image.

In another aspect, a method for managing flight of an unmanned aerial vehicle (UAV) is provided. The method comprises: verifying, at an application processing module, a validity of a system image of the system in a secure environment; and preventing, at a flight control module operably coupled to the application processing module, generation and/or transmission of control signals from the flight control module to one or more ESC controllers prior to verification of the validity of the system image.

It shall be understood that different aspects of the disclosure can be appreciated individually, collectively, or in combination with each other. Various aspects of the disclosure described herein may be applied to any of the particular applications set forth below or for any other types of movable objects. Any description herein of an aerial vehicle may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 5 illustrates different flight related functions which require functioning, or processing by different modules, in accordance with embodiments.

DETAILED DESCRIPTION

Figure 1:
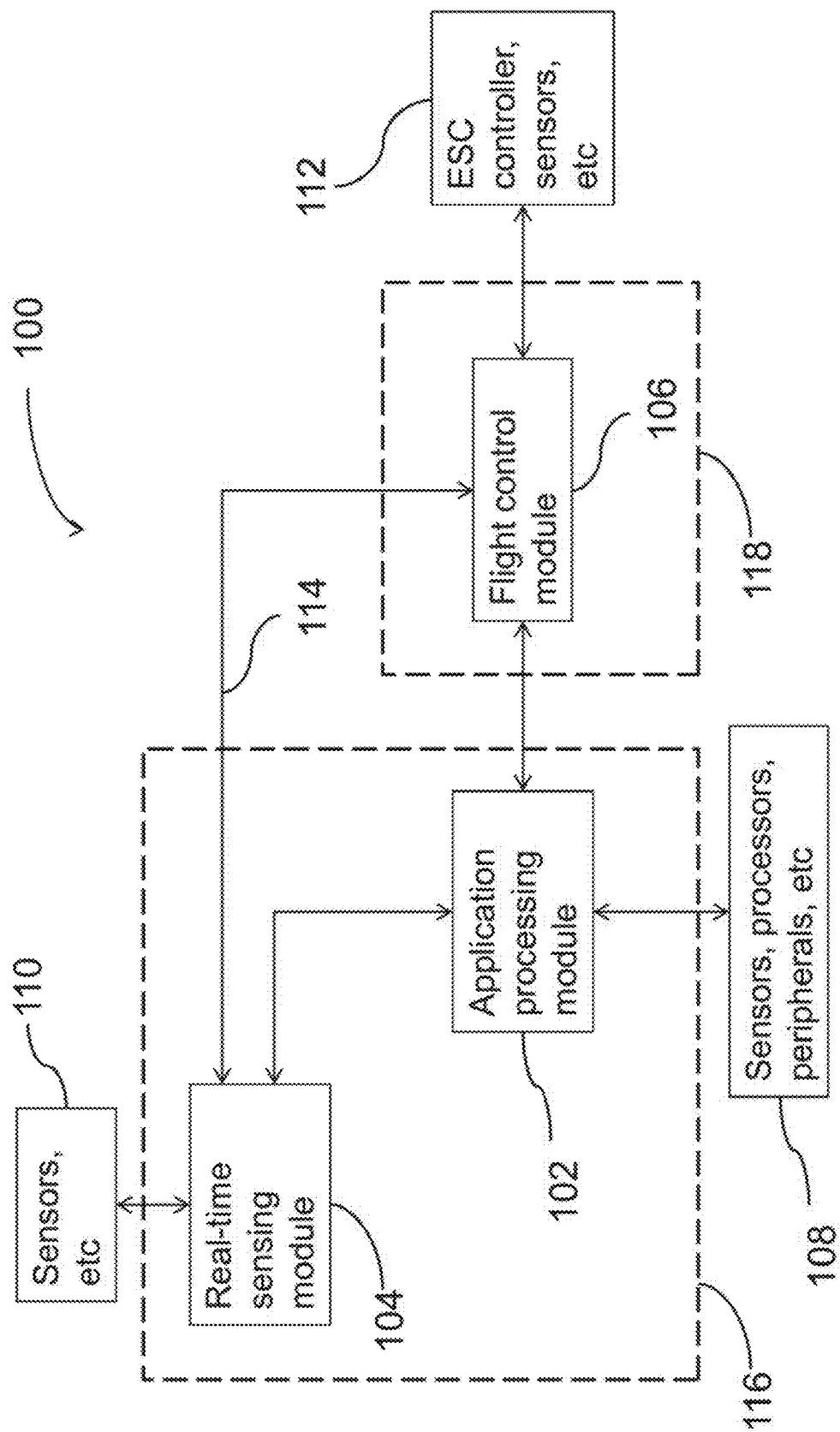
FIG. 1 illustrates a hardware architecture of an unmanned aerial vehicle (UAV), in accordance with embodiments.

Systems, methods, and devices provided herein can be used to improve efficiency and operational capability of aerial vehicles. The aerial vehicles as used herein may refer to an unmanned aerial vehicle (UAV), or any other type of movable object. In some instances, a flight control module (also referred to as a "flight control circuit") may be provided for controlling a flight of a UAV. For example, the flight control module may be responsible for generating one or more signals that effect movement of one or more propulsion units of the UAV, e.g., via electronic speed controllers (ESC controllers). In some instances, the flight control module may lack sufficient computing capacity, may inefficiently process data (e.g., everything in real time), provide minimal hardware interface, lack software features, have poor scalability, and/or poor security.

In some instances, additional processing modules may be provided for processing data or implementing features for the aerial vehicles. The additional processing modules may be utilized in conjunction with the flight control module. Collectively, the additional processing modules and the flight control module may be referred to as the different processing modules. The different processing modules may be provided on board the UAV. The different processing modules may supplement the flight control module. The different processing modules may ensure a powerful computing capacity, enable large operating system such as Android or Linux to be run on the UAV, support chip level security, have real time processing capabilities, and/or high reliability.

In some instances, the different processing modules may be able to communicate directly with one another and may be active at different times in order to implement functionalities or features of the aerial vehicle. The ability for a subset of the different processing modules to efficient implement features may be enabled by the ability for the different processing modules to directly communicate with one another. For example, an application processing module (also referred to as an "application processing circuit"), a real-time sensing module (also referred to as a "real-time sensing circuit"), and a flight control module may be provided, e.g., on-board a UAV. A subset of the different processing modules may communicate with one another to process data and/or implement a function of the UAV. For example, the real-time sensing module may be utilized to accomplish real time processing of data or implementation of functions that require large computing capacity and work with the flight control module to implement features of the UAV. In some instances, the features may relate to reactionary features and/or passive flight features. For example, the features may include passive obstacle avoidance and/or vision based hovering.

In some instances, the application processing module may be utilized to accomplish processing of data or implementation of functions that do not require, or are not benefitted substantially by, real-time processing. The application processing module may work with the flight control module and/or the real-time sensing module implement features of the UAV. In some instances, the features may relate to mission planning, directed autonomous flight, and/or payload related.

Each of the different processing modules may comprise unique features and may comprise distinct roles within the UAV hardware architecture. For example, the application processing module may act as a core of the UAV hardware architecture and provide security to the whole UAV system. In some instances, the application processing module may offer modularity to the UAV by offering various connectivity and interfaces. In some instances, the application processing module may act as a hub for data processing and analysis by being able to receive information or data from the real-time sensing module and/or the flight control module and generating information useful for flight of the UAV. In some instances, the different processing modules may be coupled (e.g., directly coupled) to different types of devices and/or sensors. The differential coupling of devices and/or sensors may enable to the UAV hardware architecture to be able to efficiently divide up the different types of processing loads, improve UAV features, and enable new UAV operational capabilities.

It shall be understood that different aspects of the disclosure can be appreciated individually, collectively, or in combination with each other. Various aspects of the disclosure described herein may be applied to any of the particular applications set forth below or for any other types of remotely controlled vehicles or movable objects.

FIG. 1 illustrates a hardware architecture 100 of an unmanned aerial vehicle (UAV), in accordance with embodiments. In some instances, the UAV may comprise one or more processing modules (processing circuits). The processing modules may be provided on-board the UAV. Alternatively or in addition, some of the processing modules may be provided off-board the UAV, e.g., at a ground terminal. The one or more processing modules of the UAV may comprise an application processing module 102. Alternatively or in addition, the one or more processing modules may comprise a real-time sensing module, flight control module, image processing module (also referred to as an "image processing circuit"), image transmission module (also referred to as an "image transmission circuit" or "image transmitter"), or other modules as further described below.

The application processing module may be provided as a centerpiece for managing flight or operation related to the aerial vehicle. The application processing module may comprise one or more processors. For example, the application processing module may comprise one, two, three, four, five, six, seven, eight, nine, ten, or more processors. Each of the processors may be a single core or multi-core processor. An application processing module with a single processor may also be referred to herein as an application processor.

In some instances, the application processing module may comprise a central processing unit (CPU). Alternatively or in addition, the application processing module may comprise a graphical processing unit (GPU). The GPU may be a dedicated GPU as further described below. Alternatively, the GPU may be an integrated GPU on a same die as the CPU. The CPU and/or the GPU may provide powerful computing capacity to the application processing module such that the application processing module is able to process data or accomplish tasks requiring high processing power (e.g., visual computing). In some instances, the application processing module may alternatively or additionally be responsible for encoding of data, providing a secure environment for the UAV system (e.g., system image), updating the UAV system, providing system interoperability with other peripheral devices or processing modules. In some instances, the application processing module may be responsible for managing other peripheral devices or processing modules and/or processing data from other devices or modules.

In some instances, the application processing module may be configured to run an operating system. The operating system may be a general purpose operating system configured to run a plurality of other programs and applications, depending on mission requirements or user preference. In some instances, the applications that may run on the application processing module may relate to flight and/or control of the UAV. In some instances, external devices coupled to the application process module (e.g., via various interfaces provided) may load programs or applications which may be run on the application processing module. For examples, applications having to do with vision sensing, tracking, video systems, etc may be run on the application processing module. In some instances, applications that may run on the UAV may be user configurable and/or updatable. Accordingly, the operating system may provide a means to update and/or add functionality to the UAV. In some instances, the operational capabilities of the UAV may be updated or increased with no hardware upgrades. In some instances, the operational capabilities of the UAV may be updated or increased only with a software update via the operating system. In some instances, the operating system may be a non-real time operating system. Alternatively, the operating system may be a real-time operating system. A real time operating system may be configured to respond to input (e.g., input data) instantly, or in real time. A non-real time operating system may respond to input with some delay. Examples of non-real time operating systems may include, but are not limited to, Android, Linux, Windows, etc.

In some instances, the application processing module may provide a plurality of interfaces for coupling, or connecting, to peripheral devices. The interfaces may be any type of interface and may include, but are not limited to USB, UART, I2C, GPIO, I2S, SPI, MIPI, HPI, HDMI, LVDS, and the like. The interface may comprise a number of characteristics. For example, the interface may comprise characteristics such as a bandwidth, latency, and/or throughput. In some instances, the peripheral devices may comprise additional sensors and/or modules. The peripheral devices may be coupled to the application processing module via specific interfaces depending on needs (e.g., bandwidth or throughput needs). In some instances, a high bandwidth interface (e.g., MIPI) may be utilized where high bandwidth is necessary (e.g., image data transmission). In some instances, a low bandwidth interface (e.g., UART) may be utilized where low bandwidth is necessary (e.g., control signal communication). As an example, a MIPI may be utilized for transmission of data between an application processing module and an image processing module. As an example, an HPI may be utilized for transmission of data between an application processing module and an image transmission module. As an example, a USB may be utilized for transmission of data between an application processing module and a real-time sensing module, or between an application processing module and a flight control module. As an example, a UART may be utilized for transmission of control signal, e.g., between the flight control module and image transmission module.

The interfaces may provide modularity to the UAV such that a user may update peripheral devices depending on mission requirements or preference. For example, depending on a user's needs and mission objectives, peripheral devices may be added or swapped in and out to enable a modular configuration that is best suited for the UAV objective. In some instances, the plurality of interfaces may easily be accessible by a user. In some instances, the plurality of interfaces may be located within a housing of the UAV. Alternatively or in addition, the plurality of interfaces may be located in part, on an exterior of the UAV.

As previously described herein, the application processing module may act as a core piece of the UAV hardware architecture. The application processing module may manage and/or interact with various peripheral devices, sensors, and/or other processors 108. The application processing module may communicate with the real-time sensing module 104 and/or the flight control module 106 for efficient processing of data and implementation of UAV features. In some instances, the application processing module may intake data or information from any or all of the other processing modules and further process data to generate useful information for flight of the UAV (e.g., grid map building). In some instances, the application processing module may ensure that different programs, input, and/or data is efficiently divided up and being processed by different processing modules. In some instances, the operating system ran on the application processing module, as well as the various interfaces which enable an operator of the UAV to configure the UAV to operate with updated applications and/or devices (e.g., peripherals) may provide the UAV great modularity and configurability such that it is able to operate under conditions best suited for a given mission objective.

In some instances, the application processing module may provide, or be responsible, for security of the UAV system. Security of the UAV system may be necessary for ensuring that resources of importance cannot be copied, damaged, or made unavailable to genuine users. Genuine users may include owners and/or authorized users of the UAV. In some instances, security of the UAV system may be necessary for ensuring that the UAV remains stable and responsive to commands from a genuine user and that unauthorized or non-genuine users (e.g., hackers) cannot compromise a system image of the UAV.

The system image of the UAV may comprise a complete state of the UAV system including the state of the application processing module (e.g., operating system state). In some instances, the system image of the UAV may comprise states of the other processing modules and/or other components of the UAV system. The application processing module may provide security via software (e.g., applications running on the operating system). For example, the operating system ran on the application processing module may provide security solutions for the UAV. In some instances, the application module may provide security via hardware security measures. In some instances, a combination of integrated hardware and software components may provide security to the UAV system as further described elsewhere.

Figure 9:
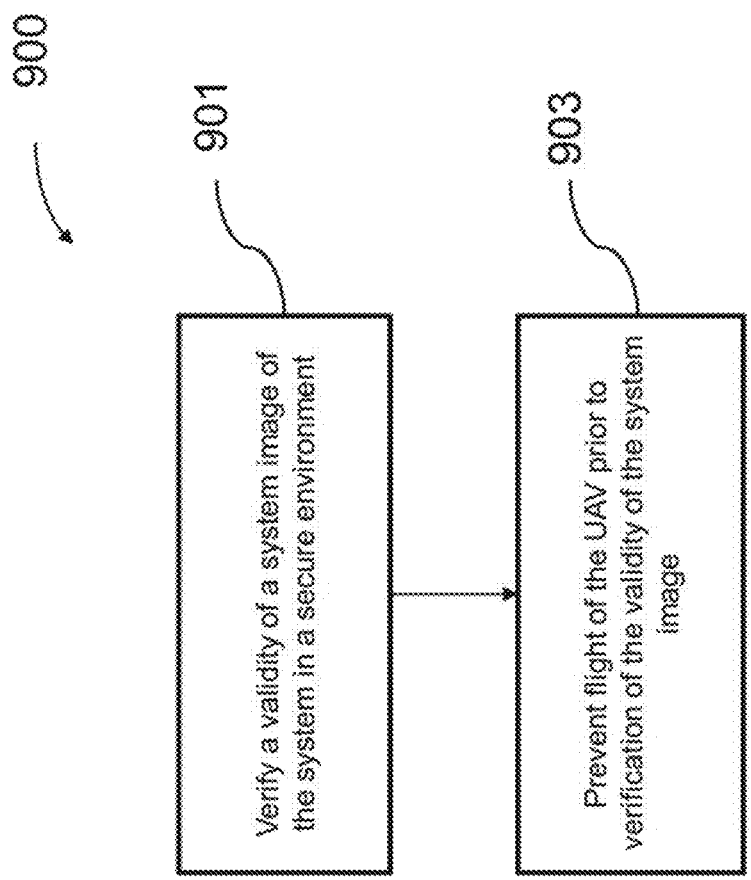
FIG. 9 illustrates a method for managing flight of an UAV with security measures, in accordance with embodiments.

FIG. 9 illustrates a method for managing flight of an UAV with security measures, in accordance with embodiments. As previously described herein, the application processing module may provide a security measure for the UAV system. In step 901, an application processing module may verify a validity of a system image of the UAV system in a secure environment. The secure environment may be an environment provided by via software security measures, hardware security measures, or a combination thereof.

In step 903, a flight of the UAV prior to verification of the validity of the system image may be prevented. In some instances, the flight may be prevented due to the application processing module. For example, if a validity of the system image of the UAV system cannot be verified by the application processing module, no instructions may be generated and/or transmitted to ESC controllers from the flight control module to affect movement of the UAV. In some instances, generation and/or transmission of control signals from the flight control module to one or more ESC controller may be prevented such that the UAV is prevented from taking off. Accordingly, the UAV may be allowed flight only when it is ensured that the UAV is stable and able to function properly.

In some instances, the application processing module may be configured to verify a validity of the system image when the UAV is powering up. Alternatively or in addition, the application processing module may be configured to verify a validity of the system image when a payload (e.g., primary imaging sensor) of the UAV is powering up. Alternatively or in addition, the system image of the UAV may be verified at predetermined intervals. For example, the system image may be configured to be verified by the application processing module about or more frequently than every 6 months, every 3 months, every month, every 2 weeks, every week, every 3 days, every 24 hours, every 12 hours, every 6 hours, every 3 hours, or every hour.

In some instances, the UAV system may comprise a micro fuse comprising a key for verifying the validity of the system image. The application processing module may be configured to verify a validity of the system image with aid of the key burned into the micro fuse. In some instances, only verified system images may be allowed to start up. For example, an operating system of the UAV or the application processor may not be allowed to start up prior to verification of the system image. In some instances, the application processing module is further configured to verify and record a login information of a user in the secure environment before flight of the UAV is allowed.

In some instances, the application processing module is configured to receive data from an imaging sensor and store the data in the secure environment. Storage of image data in the secure environment may enable for the protection of intellectual property (e.g., photography) of UAV users. In some instances, the application processing module is further configured to encrypt the data (e.g., image data) before transmission of the data to a storage medium. In some instances, the encrypted data may be decrypted only by appropriate users. In some instances, the appropriate user is an operator of the UAV or an owner of the UAV. Alternatively or in addition, the appropriate user may comprise authorized users who may have been granted permission.

In some instances, the UAV system may comprise additional processing modules also referred to herein as other processing modules. The other processing modules may comprise a real-time sensing module and/or flight control module, as described below. In some instances, the other processing modules may be configured to receive the system image from the application processing module. In some instances, the other processing module may further be configured to verify the validity of the received image. For example, the other processing modules may verify the validity of received images using respective private keys. In some instances, the flight control module may prevent flight of the UAV prior to verification of the validity of the imaging system by (1) the application processing module, and (2) other processing modules such as the real-time sensing module.

The application processor may enable safe system upgrading in some aspects. For example, if a UAV system needs upgrading, different processors or processing modules may receive the upgraded system image from the application processing module and verify a validity of the image using the respective private keys. Afterwards, the other processing modules may proceed to upgrade the system image.

In some instances, the flight control module is an embedded processor as described herein. The flight control module may act as a backup component in case the application processing module fails. In some instances, the application processing module may be located on a first printed circuit board, and the flight control module may be located on a second printed circuit board. In some instances, the UAV system may comprise an image processing module, and the image processing module may be located on a third printed circuit board. In some instances, different modules may be coupled to different sensors on board the UAV, substantially as described below.

Alternatively or in addition to the application processing module, the one or more processing modules processing modules of the UAV may comprise a real time sensing module 104. The real-time sensing module may comprise one or more processors. For example, the real-time sensing module may comprise one, two, three, four, five, six, seven, eight, nine, ten, or more processors. Each of the processors may be a single core or multi-core processor. A real-time sensing module with a single processor may also be referred to herein as a real-time sensing processor.

In some instances, the real-time sensing module may comprise a visual processor and/or a digital signal processor. The real-time processing module may comprise powerful image processing capabilities and may operate in real-time.

In some instances, the real-time sensing module may process data from one or more sensors 110 to obtain a height measurement (e.g., height of the UAV relative to a ground) or a speed measurement (e.g., speed of the UAV). In some instances, the real-time sensing module may process data from the one or more sensors and be responsible for obstacle detection and depth map calculation.

The real-time sensing module may be responsible for processing and/or overseeing functionalities of the UAV that may have high requirements of real-time processing, e.g., passive obstacle avoidance. In some instances, the real-time sensing module may be responsible for reactionary features and/or passive autonomous flight features of the UAV. In some instances, the real-time sensing module may process information from one or more other processing modules and oversee data fusion of sensor data such that more accurate information regarding a state of the UAV can be ascertained. For example, the real-time sensing module may process sensor information transmitted from a flight control module 106.

Alternatively or in addition to the application processing module or the real time sensing module, the one or more processing modules of the UAV may comprise a flight control module 106. The flight control module may comprise one or more processors. For example, the flight control module may comprise one, two, three, four, five, six, seven, eight, nine, ten, or more processors. Each of the processors may be a single core or multi-core processor. In some instances, the flight control module may comprise an embedded processor such as a reduced instruction set computer (RISC). The RISC may operate at a high speed, performing more than millions of instructions per second (MIPS). The flight control module may be configured to process data in real time and with high reliability.

In some instances, the flight control module may be configured to effect functionalities or features of the UAV, e.g., by controlling movement of one or more propulsion units on board the UAV. For example, according to instructions or information received from other processing modules, the flight control module may affect movement of the UAV such that the features are implemented. In some instances, the flight control module may be configured to maintain a stable flight of the UAV. The flight control module may be configured to process information (e.g., information received from sensors coupled to the flight control module) such that stable flight of the UAV is maintained. For example, in event of failure of the application processing module and/or the real-time sensing module, the flight control module may prevent complete failure or crashing of the UAV. In some instances, the flight control module may be sufficient to maintain flight of the UAV in the air, e.g., without functioning of the application processing module and/or the real-time sensing module.

Having high reliability and ability to process information in real time may be critical for the flight control module as the flight control module may be responsible for ultimate flight control of the UAV. For example, based on the various data (e.g., from the application processing module, the real-time processing module, and/or one or more sensors coupled to the flight control module), the flight control module may control flight of the UAV by sending one or more instructions to one or more electronic speed control (ESC) controllers 112. The one or more ESC controllers may be configured to precisely and efficiently control a velocity of motors coupled to one or more propulsion units of the UAV, thereby directly affecting actual flight of the UAV. In some instances, the application processing module and/or the real-time sensing module may not be coupled (e.g., directly coupled to) ESC controllers. In some instances, the application processing module and/or the real-time sensing module may not control or send a set of instructions for controlling ESC controllers.

In some instances, the flight control module may be configured to perform sensor data fusion. For example, based on sensor data obtained from one or more sensors coupled to the flight-control module and sensor data relayed by the real-time sensing module, the flight control module may perform sensor data fusion such that more accurate information regarding a state of the UAV can be ascertained. Based on information obtained from one or more sensors coupled to the flight control module and/or information relayed from the real-time sensing module or the application processing module, the flight control module may govern actual flight of the UAV by affecting movement of the one or more ESC controllers. In some instances, the flight control module act as a back-up or and may maintain flight (e.g., stable flight) of the UAV in case other processing modules (e.g., the application processing module or the real-time sensing module) fail.

The one or more processing modules of the UAV may comprise alternative and/or additional types of processing modules. For example, the one or more processing modules of the UAV may comprise image processing modules, image transmission modules, or other processing modules as described herein. The aforementioned processing modules may be provided individually, or in any combination, on and/or off board the UAV.

In some instances, two or more processing modules may be provided for managing flight of an aerial vehicle. The processing modules may be provided on-board the UAV. Alternatively or in addition, some of the processing modules may be provided off-board the UAV, e.g., at a ground terminal. Any combination or variation of the processing modules may be provided. For example, the two or more processing modules may comprise a real time sensing module and a flight control module. In some instances, the two or more processing modules may comprise an application processing module and a flight control module. In some instances, the two or more processing modules may exclude any of the processing modules described herein. For example, the two or more processing modules may comprise a real time sensing module and a flight control module, but not an application processing module. In some instances, the two or more processing modules may comprise a real time sensing module and a flight control module, but not a real time sensing module.

The two or more processing modules may comprise different processing modules configured to manage different operational aspects of the aerial vehicle. For example, referring back to FIG. 1, the application processing module 102 may process information related to computationally intensive tasks or operations that do not require real time processing while a real time sensing module 104 may process information related to operations that require real time processing of data. Providing for different processing modules may be advantageous as parts of UAV operation may have real-time requirements while parts of UAV operation may not have real-time processing requirements. Providing for different processing modules may enable an efficient use of resources on board the UAV as the application processing module may act as a core module of the UAV processing a large amount of data that does not require real-time processing while the real time sensing module may act as a support and ensure optimal operation (e.g., stable operation) of the UAV by processing some data (e.g., some data from one or more sensors) where necessary or beneficial, in real time.

In some instances, three, four, five, six, seven, eight, nine, ten or more processing modules may be provided for managing flight of an aerial vehicle. The processing modules may be provided on-board the UAV. Alternatively or in addition, some of the processing modules may be provided off-board the UAV, e.g., at a ground terminal. The plurality of different processing modules may be configured to manage different operational aspects of the aerial vehicle. For example, the flight of the UAV may be managed by at least three processing modules. In some instances, the at least three processing modules may comprise the application processing module, the real-time sensing module, and a flight control module 106. For example, the application processing module may be utilized to accomplish processing of data or implementation of functions that do not require, or are not benefitted substantially by, real-time processing, the real-time sensing module may be utilized to accomplish real time processing of data or implementation of functions that require large computing capacity and work with the flight control module to implement features of the UAV, and the flight control module may implement required flight measures and act as a backup to maintain stable flight of the UAV.

The different processing modules may be configured to communicate with one another. In some instances, the different processing modules may be configured to directly communicate with each other. Direct communication as used herein may refer to ability to communicate with one another without having to go through one or more other processing modules. For example, the real-time sensing module and the flight control module may be configured to communicate data or information without going through the application processing module as an intermediary as shown by connection 114. In some instances, the real-time sensing module and/or the application processing module may not directly communicate with ESC controllers 112 and may need to convey data or information to the flight control module which may affect operation of the ESC controllers.

The flow of information or data may be in any direction as indicated by the arrows of the connections between the different processing modules 102, 104, 106. For example, data may flow from the real-time sensing module to the application processing module and/or the flight control module. Alternatively or in addition, data or information may flow from the application processing module to the flight control module and/or the real time sensing module. Alternatively or in addition, data or information may flow from the flight control module to the real-time sensing module and/or the application processing module. In some instances, data may not flow from the flight control module to the application processing module.

The ability for the different processing modules to communicate (e.g., directly communicate) with one another may enable a subset of the different processing modules to accomplish a task or process data in an efficient manner best suited for a given operation of the UAV. Utilizing different processing modules (e.g., the aforementioned application processing module, real-time sensing module, and flight control module) and enabling direct communication between the modules may enable appropriate coupling of sensors, controllers, and devices to the different processing modules such that flight of the UAV can be managed in an efficient manner where suited processing modules take care of different operational aspects of the UAV. In some instances, the real-time sensing module may process data that requires real time processing, the application processing module may process data that does not require real time processing, and the flight control module may affect movement of ESC controllers based on data from the different processing modules or from sensors coupled to the flight control module.

In some instances, different printed circuit boards (PCBs) may be provided for the different processing modules. In some instances, at least two PCBs may be provided on board the UAV. For example, the real-time sensing module may be provided on a first PCB and the flight control module may be provided on a different second PCB. In some instances, the application processing module may be provided on a first PCB and the flight control module may be provided on a different second PCB. In some instances, the application processing module and the real-time sensing may be provided on a first PCB 116 and the flight control module may be provided on a second PCB 118.

Figure 2:
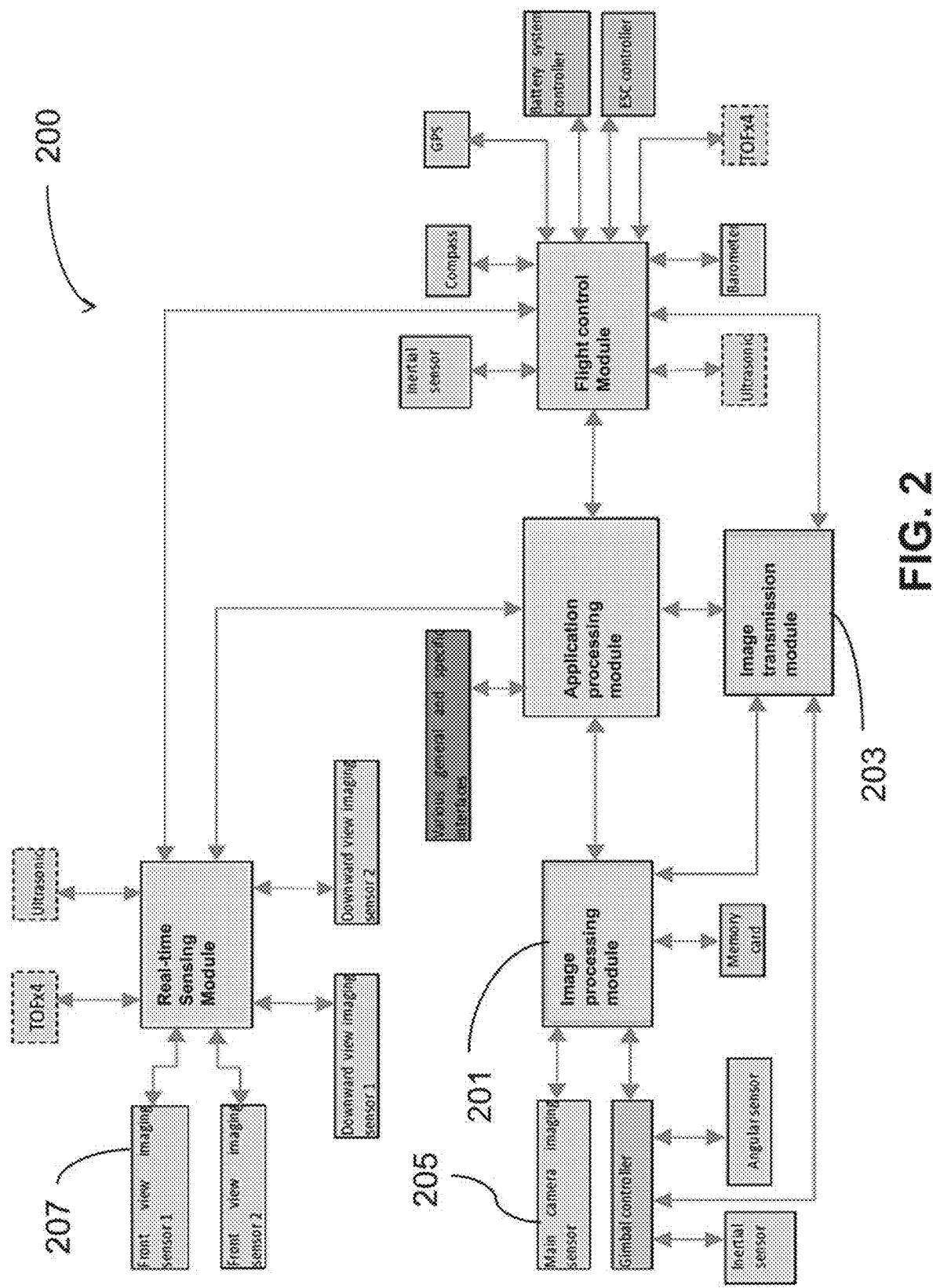
FIG. 2 illustrates a detailed UAV hardware architecture, in accordance with embodiments.

FIG. 2 illustrates a detailed UAV hardware architecture 200, in accordance with embodiments. As previously described herein, the UAV may comprise additional processing modules in addition to the aforementioned application processing module, real-time sensing module, and flight control module. For example, an image processing module 201 may be provided. The image processing module may comprise one or more processors. For example, the image processing module may comprise one, two, three, four, five, six, seven, eight, nine, ten, or more processors. Each of the processors may be a single core or multi-core processor. An image processing module with a single processor may also be referred to herein as an image processor. In some instances, the image processing module may comprise a dedicated graphical processing unit (GPU).

In some instances, the image processing module may be coupled to one or more imaging sensors and may be configured to provide a high-quality image capturing and video capturing, e.g., high dynamic range image (HDR) capturing. In some instances, the image processing module may process data captured by one or more imaging sensors or may help manage the one or more imaging sensors. For example, the image processing module may enable delayed shooting (image capturing), provide digital filters, process images to reduce noise, provide defogging, 4K video recording, etc. Alternatively or in addition, the application processing module may help manage the one or more imaging sensors and may enable the aforementioned functionalities, e.g., delayed shooting, providing digital filters, etc. In some instances, the image processing module may be coupled to gimbal and/or a gimbal controller. The gimbal may comprise any type of gimbal, e.g., two-axis gimbal, three-axis gimbal, multi-axis gimbal, etc. The gimbal controller may comprise a real-time system, e.g., process input in real time. In some instances, the gimbal controller may be a micro-controller for controlling the servo angle of the gimbal such as a tri-axial gimbal. The gimbal controller may be configured to drive servo motors of the gimbal to smoothly rotate a payload (e.g., imaging device) to a desired angle.

In some instances, an image transmission module 203 may be provided. The image transmission module may comprise one or more processors. For example, the image transmission module may comprise one, two, three, four, five, six, seven, eight, nine, ten, or more processors. Each of the processors may be a single core or multi-core processor. An image transmission module with a single processor may also be referred to herein as an image transmission processor. In some aspects, the image transmission module may comprise a controller, field programmable gate array (FPGA), or a combination thereof. In some instances, the image transmission module may be coupled to gimbal and/or a gimbal controller, substantially as described with respect to the image processing module.

In some instances, the image transmission module may comprise a dedicated wireless image transmission chip. In some instances, the image transmission module may establish reliable communication links between a ground terminal or user terminal and the UAV. The ground terminal may comprise remote controllers, mobile devices such as cellphones or tablets, and the like. The image transmission module may be configured to receive one or more control signals from a ground terminal (e.g., a user terminal) and transmit one or more signals (e.g., image data, UAV state data, etc) to the ground terminal. In some instances, the one or more image data may be received from the aforementioned image processing module. The image transmission module may have a high reliability and minimal delay. A real-time operating system may run on the image transmission module. In some instances, the real-time operating system may enable the image transmission module to compress images or videos and send data (e.g., image data) with high-bandwidth and low latency.

In some instances, the image processing module and the image transmission module may collectively be referred to as an image module. The image processing module and the image transmission module may in some instances, implement UAV features. The UAV features may comprise payload related features. For example, a user may provide an input on a user terminal. The input may relate to the UAV payload. For example, the payload may be an imaging device, and the user input may relate to parameter settings, image capturing instruction, video recording instruction and gimbal control instruction. The user input may be transmitted to the image transmission module of the UAV via a communication link such as a wireless link. The image transmission module may transmit the input (e.g., parameter settings and instructions) to the image processing module and/or gimbal controller. The image processing module may relay the instructions or generate instructions to the imaging device 205 which may then capture images and videos. The image processing module may process the captured images and videos, compress the images and videos and store them in memory card based upon the received parameters.

In another aspect, data from the imaging device 205 may be transmitted to the image processing module via high-definition (HD) image transmission. In some instances, the image processing module may comprise powerful processing capabilities and may be able to encode HD videos at the same time the image and video is captured. The encoded data may then be directly transmitted to the image transmission module or transmitted to the image transmission module through the application processing module. The image transmission module may then transmit the encoded data to a ground terminal (e.g., user terminal). In some instances, if the image processing module is not powerful enough, the image or video data from the imaging device may be transmitted to the application processing module. The application processing module may encode the image or video data and transmit the encoded HD video data to the image transmission module, which may subsequently transmit the encoded data to a ground terminal.

Figure 3:
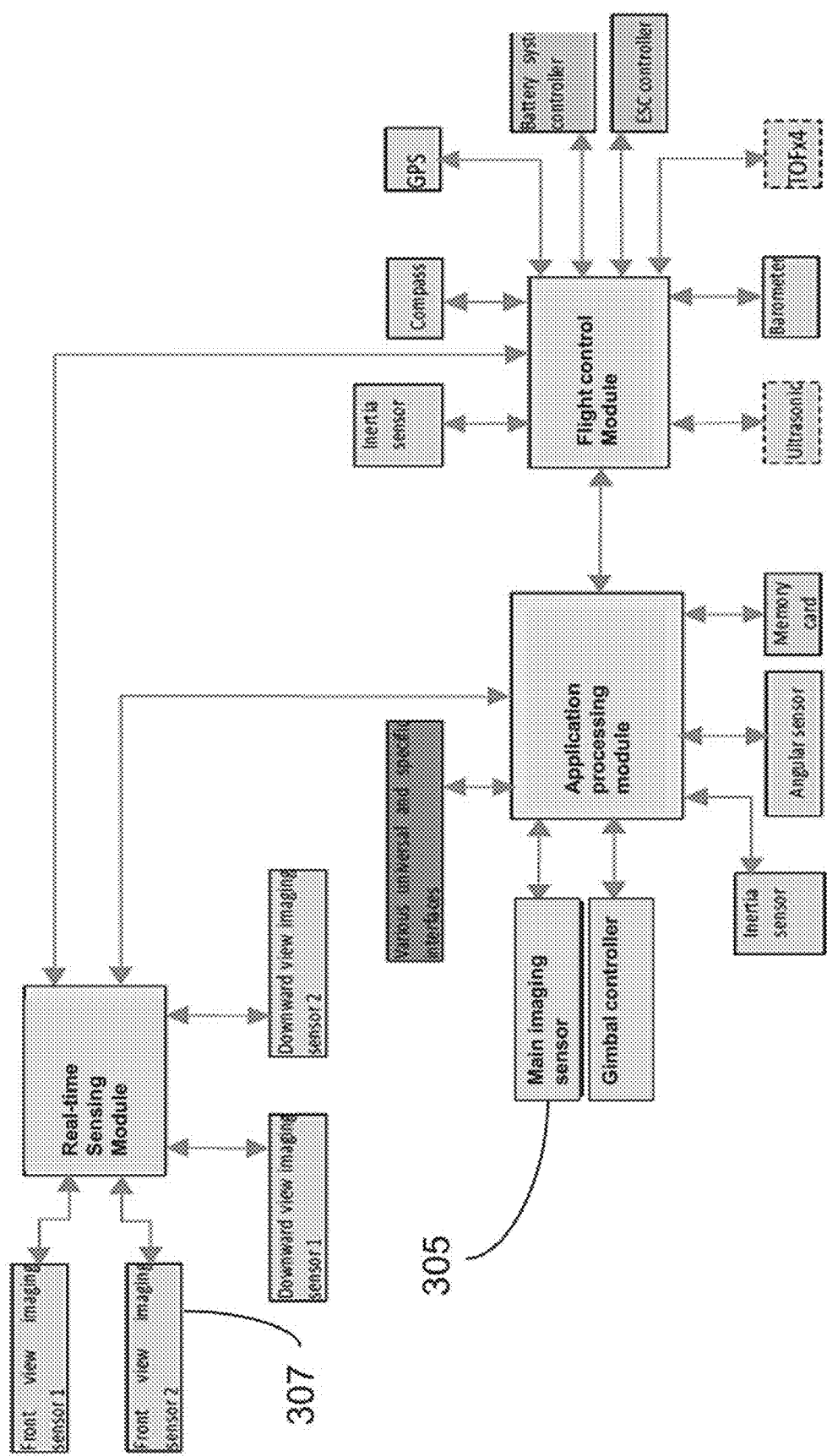
FIG. 3 illustrates a UAV hardware architecture in which the image processing module and the image transmission module have been integrated with the application processing module, in accordance with embodiments.

In some instances, the image processing module and/or the image transmission module may be integrated with the application processing module. FIG. 3 illustrates a UAV hardware architecture in which the image processing module and the image transmission module have been integrated with the application processing module, in accordance with embodiments. Accordingly, the application processing module may in some instances comprise the functionalities of the image processing module and/or the image transmission module. The integration of the image processing module and/or the image transmission module may provide a simpler system and may help reduce costs associated with producing the UAV hardware architecture with the different processing modules.

As previously described throughout, different sensors and/or peripheral components may be coupled to different processing modules for efficient utilization of UAV resources and processing of data. In some instances, one or more sensors may be coupled to the different processing modules. The one or more sensors may be capable of sensing the environment and/or a state of the UAV.

The one or more sensors may include an imaging device. An imaging device may be a physical imaging device. An imaging device can be configured to detect electromagnetic radiation (e.g., visible, infrared, and/or ultraviolet light) and generate image data based on the detected electromagnetic radiation. An imaging device may include a charge-coupled device (CCD) sensor or a complementary metal-oxide-semiconductor (CMOS) sensor that generates electrical signals in response to wavelengths of light. The resultant electrical signals can be processed to produce image data. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia). The imaging device may include a lens configured to direct light onto an image sensor.

The imaging device can be a camera. A camera can be a movie or video camera that captures dynamic image data (e.g., video). A camera can be a still camera that captures static images (e.g., photographs). A camera may capture both dynamic image data and static images. A camera may switch between capturing dynamic image data and static images. Although certain embodiments provided herein are described in the context of cameras, it shall be understood that the present disclosure can be applied to any suitable imaging device, and any description herein relating to cameras can also be applied to any suitable imaging device, and any description herein relating to cameras can also be applied to other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene. The camera may comprise optical elements (e.g., lens, mirrors, filters, etc). The camera may capture color images, greyscale image, infrared images, and the like. The camera may be a thermal imaging device when it is configured to capture infrared images.

In some embodiments, the imaging device may include multiple lenses and/or image sensors. The imaging device may be capable of taking multiple images substantially simultaneously. The multiple images may aid in the creation of a 3D scene, a 3D virtual environment, a 3D map, or a 3D model. For instance, a right image and a left image may be taken and used for stereo-mapping. A depth map may be calculated from a calibrated binocular image. Any number of images (e.g., 2 or more, 3 or more, 4 or more, 5 or more, 6 or more, 7 or more, 8 or more, 9 or more) may be taken simultaneously to aid in the creation of a 3D scene/virtual environment/model, and/or for depth mapping. The images may be directed in substantially the same direction or may be directed in slightly different directions. In some instances, data from other sensors (e.g., ultrasonic data, LIDAR data, data from any other sensors as described elsewhere herein, or data from external devices) may aid in the creation of a 2D or 3D image or map.

The imaging device may capture an image or a sequence of images at a specific image resolution. In some embodiments, the image resolution may be defined by the number of pixels in an image. In some embodiments, the image resolution may be greater than or equal to about 352×420 pixels, 480×320 pixels, 720×480 pixels, 1280×720 pixels, 1440×1080 pixels, 1920×1080 pixels, 2048×1080 pixels, 3840×2160 pixels, 4096×2160 pixels, 7680×4320 pixels, or 15360×8640 pixels. In some embodiments, the camera may be a 4K camera or a camera with a higher resolution.

The imaging device may capture a sequence of images at a specific capture rate. In some embodiments, the sequence of images may be captured standard video frame rates such as about 24p, 25p, 30p, 48p, 50p, 60p, 72p, 90p, 100p, 120p, 300p, 50i, or 60i. In some embodiments, the sequence of images may be captured at a rate less than or equal to about one image every 0.0001 seconds, 0.0002 seconds, 0.0005 seconds, 0.001 seconds, 0.002 seconds, 0.005 seconds, 0.01 seconds, 0.02 seconds, 0.05 seconds, 0.1 seconds, 0.2 seconds, 0.5 seconds, 1 second, 2 seconds, 5 seconds, or 10 seconds. In some embodiments, the capture rate may change depending on user input and/or external conditions (e.g. rain, snow, wind, unobvious surface texture of environment).

The imaging device may have adjustable parameters. Under differing parameters, different images may be captured by the imaging device while subject to identical external conditions (e.g., location, lighting). The adjustable parameter may comprise exposure (e.g., exposure time, shutter speed, aperture, film speed), gain, gamma, area of interest, binning/subsampling, pixel clock, offset, triggering, ISO, etc. Parameters related to exposure may control the amount of light that reaches an image sensor in the imaging device. For example, shutter speed may control the amount of time light reaches an image sensor and aperture may control the amount of light that reaches the image sensor in a given time. Parameters related to gain may control the amplification of a signal from the optical sensor. ISO may control the level of sensitivity of the camera to available light.

In some alternative embodiments, an imaging device may extend beyond a physical imaging device. For example, an imaging device may include any technique that is capable of capturing and/or generating images or video frames. In some embodiments, the imaging device may refer to an algorithm that is capable of processing images obtained from another physical device.

In some instances, different types of imaging devices may be provided. For example, a primary imaging sensor 305 and one or more secondary imaging sensors 307 may be provided. The primary imaging sensor may also be referred to as a first imaging sensor, a main imaging sensor, or a main camera imaging sensor. In some instances, a primary imaging sensor may refer to an imaging device coupled to a gimbal. Alternatively or in addition, the primary imaging sensor may refer to an imaging device with adjustable parameters, previously described herein. In some instances, image data captured by the primary imaging sensor may be configured to be transmitted to a user terminal and/or viewed by an operator of the UAV. The image data captured by the primary imaging sensor may be a first person view image of the UAV. In some instances, only one primary imaging sensor may be coupled to a UAV. In some instances, only a single primary imaging sensor may be coupled to the processing modules on board a UAV. While the primary imaging sensor is shown coupled directly to the application processing module (e.g., comprising image processing module and/or image transmission module) in FIG. 3, it is to be understood that the primary imaging sensor may be coupled to the application processing module via the image processing module as shown in FIG. 2.

In some instances, the primary imaging sensor may refer to an imaging device that is a payload of the UAV, and any description applicable to primary imaging sensor may be applicable for other types of payloads. The payload of the UAV may govern, or be associated with a mission (e.g., aerial photography) or an objective of the UAV. In some instances, payload related operations may or may not have real-time sensitive processing requirements. For example, payload related operations may not be related to flight of the UAV, and it may not be critical that data is processed in real time. Alternatively, payload related operations may be related to data which needs to be processed in real time, depending on a function of the payload.

The payload of the UAV may include other devices. For example, the payload may include one or more devices capable of emitting a signal into an environment. In some instances, the payload may include an emitter along an electromagnetic spectrum (e.g., visible light emitter, ultraviolet emitter, infrared emitter). The payload may include a laser or any other type of electromagnetic emitter. The payload may emit one or more vibrations, such as ultrasonic signals. The payload may emit audible sounds (e.g., from a speaker). The payload may emit wireless signals, such as radio signals or other types of signals.

The payload may be capable of interacting with the environment. For instance, the payload may include a robotic arm. The payload may include an item for delivery, such as a liquid, gas, and/or solid component. For example, the payload may include pesticides, water, fertilizer, fire-repellant materials, food, packages, or any other item. Any examples herein of payloads may apply to devices that may be carried by the movable object or that may be part of the movable object. For instance, one or more sensors may be part of the movable object. The one or more sensors may or may be provided in addition to the payload. This may apply for any type of payload, such as those described herein.

The secondary imaging sensors may refer to any imaging sensors that are not a primary imaging sensor. Secondary imaging sensor may also be referred to herein as one or more other imaging sensors. Any number of secondary imaging sensors may be provided. For example, one, two, three, four, five, six, eight, ten, fifteen, twenty, or more secondary imaging sensors may be provided on board the UAV. In some instances, the ability to provide for various secondary imaging sensors may be enabled by the different processing modules (e.g., real-time sensing module and/or application processing module) provided on board the UAV which is able to efficiently handle data transmitted by the various secondary sensors, e.g., in real time.

The one or more secondary imaging sensors may or may not comprise a resolution that is worse than that of the primary imaging sensor. In some instances, the resolution of the secondary imaging sensors may be at least 5, 10, 15, 20, 25, 30, 35, 40, 45, 50, 55, 60, 65, 70, 75, 80, 85, or 90% worse than a resolution of the primary imaging sensor. Alternatively or in addition, the secondary imaging sensors may be configured to capture gray scale image data. In some instances, the secondary imaging sensors may not be a payload of the UAV. The secondary imaging sensors may be used for flight, control, and/or navigation of the UAV. In some instances, the secondary imaging sensors may not be coupled to a gimbal. In some instances, the secondary imaging sensors may not have adjustable parameters. In some instances, image data captured by the secondary imaging devices may not be configured to be transmitted to a user terminal and/or viewed by an operator of the UAV. In some instances, image data captured by the secondary imaging devices may be configured to be processed (e.g., by a GPU) and used in passive autonomous flight of the UAV. The passive autonomous flight may be a reactionary flight of the UAV, e.g., passive obstacle avoidance or vision based hovering. Reactionary flight and/or passive autonomous flight may require real time processing of data (e.g., data generated from the sensors).

In some instances, the secondary imaging sensors may maintain a substantially static position relative to the UAV. For example, the secondary imaging sensors may be embedded in a housing or a frame of the UAV. The static positions may be front, rear, top, bottom, left, and right. For example, the secondary imaging sensors may comprise a front view imaging sensor, rear view imaging sensor, a bottom view imaging sensor, a left side imaging sensor, a right side imaging sensor, or a top view imaging sensor. Alternatively or in addition, the secondary imaging sensors may comprise any arbitrary position relative to the UAV. In some instances a pair of secondary imaging sensors may be provided for each static position. Alternatively or in addition, a secondary imaging sensor provided at a static position may be a single device but comprise stereovision and may be a binocular imaging sensor.

In some aspects, the relative position of the secondary imaging sensors may determine its function and/or determine how data collected by the secondary imaging sensors is utilized. For example, data (e.g., image data) obtained from front view imaging sensors may be utilized in obstacle avoidance and map building. For example, data obtained from laterally placed imaging sensors (left, right, or rear view imaging sensors) images may be utilized in obstacle avoidance and map building. For example, data obtained from downward imaging sensors may be utilized in detecting a height of the UAV relative to a ground and/or a velocity of the UAV.

The one or more sensors may include other types of sensors. Some examples of types of sensors may include location sensors (e.g., global positioning system (GPS) sensors, mobile device transmitters enabling location triangulation), motion sensors, vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, and/or gravity detection sensors, which may form inertial measurement units (IMUs)), altitude sensors, attitude sensors (e.g., compasses), pressure sensors (e.g., barometers), temperature sensors, humidity sensors, vibration sensors, audio sensors (e.g., microphones), and/or field sensors (e.g., magnetometers, electromagnetic sensors, radio sensors).

The global positioning system may provide a longitude, latitude, altitude and velocity information of the UAV. The compass may be an electronic compass that provides direction information of the UAV. The angular sensor can provide angular information of the tri-axis stabilizing gimbal. The inertial sensor may be a three-axis, six-axis or nine-axis sensor, and may provide acceleration, angular velocity, and/or direction angle information of the UAV. In some instances, the inertial sensor may be a three-axis, six-axis or nine-axis sensor, and may provide acceleration, angular velocity, and/or direction angle information of the gimbal. The barometer may be used to measure an atmospheric pressure to calculate a flight height of the UAV. A downward ultrasonic sensor may be provided to measure a distance (e.g., height) between the UAV and a ground. In some instances, the downward ultrasonic sensor may measure the distance between the UAV and the ground by reflection echo and Doppler Effect. The time-of-flight (TOF) sensor may emit near-infrared light which is modulated. The light emitted by the TOF sensor may be reflected upon striking an object. The TOF sensor may obtain a distance information from the UAV to the object by calculating a time difference or phase difference between the emitted light and reflected light.

Any number of sensors may be provided or coupled to the different processing modules. For example, sensors equal to, or more than about 1, 5, 10, 15, 20, 25, 30, 35, 40, 45, or 50 sensors may be coupled to the application processing module, real-time sensing module, and/or the flight control module. In some instances, one or more sensors may be removably coupled to the different processing modules. For example, the application processing module may provide various interfaces such that a user may connect various sensors as desired. The sensors may be positioned in any position relative to the UAV, e.g., on the front, back, top, bottom, within, or outside the UAV. In some instances, sensors may be provided within a housing of the UAV. Alternatively or in addition, the sensors may be embedded in a housing of the UAV or coupled outside the housing of the UAV.

One or more sensors of the same type may be provided on board the UAV. For example, 1, 2, 3, 4, 5, or more TOF sensors may be provided at left, right, front, rear and top sides of the UAV such that the distance information to obstacles in various directions relative to the UAV can be obtained. The different sensors of the same type may all be coupled to a same processing module. For example, 1, 2, 3, 4, 5, or more TOF sensors may be coupled to the real-time sensing module. Alternatively, different sensors of the same type may be coupled to different processing modules. For example, some of the TOF sensors may be coupled to the real-time sensing module while other TOF sensors may be coupled to the flight control module.

The sensing data provided by the sensors may be used to control the spatial disposition, velocity, and/or orientation of the movable object (e.g., using a suitable processing unit and/or control module, as described below). Alternatively, the sensors may be used to provide data regarding the environment surrounding the movable object, such as weather conditions, proximity to potential obstacles, location of geographical features, location of manmade structures, and the like.

Figure 4:
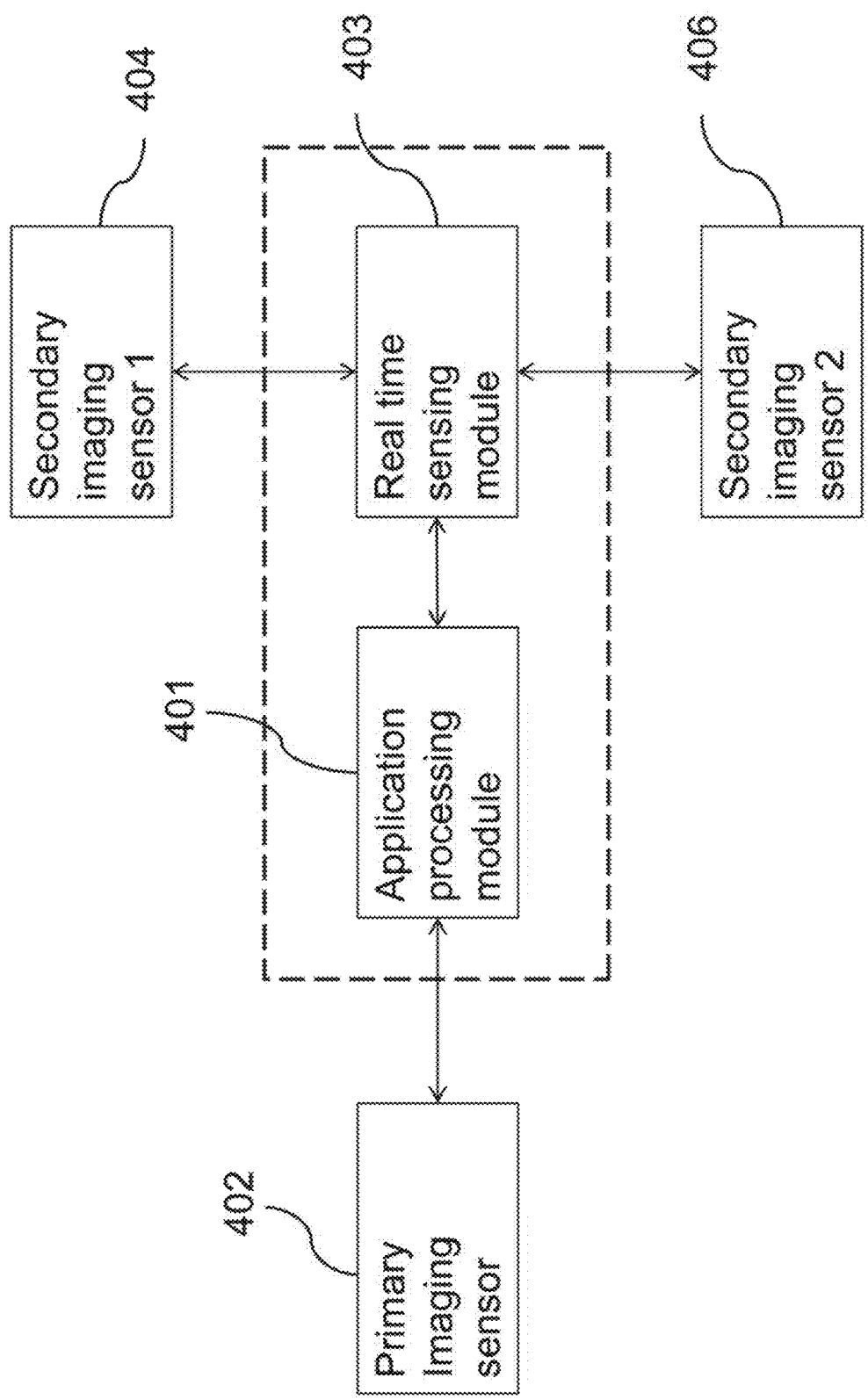
FIG. 4 illustrates a configuration where different types of sensors or devices are coupled to different processing modules, in accordance with embodiments.

In some instances, different processing modules may be coupled to different types of sensors or devices, e.g., as illustrated in FIGS. 2, 3 and 4. FIG. 4 illustrates a configuration where different types of sensors or devices are coupled to different processing modules, in accordance with embodiments. In some instances, the application processing module may be coupled to sensors or devices with adjustable parameters. For example, the application processing module may be coupled to an imaging device with adjustable parameters such as adjustable exposure, gain, gamma, area of interest, binning/subsampling, pixel clock, offset, triggering, ISO, etc. Alternatively or in addition, the application processing module may be coupled to a payload of the UAV. In some instances, a payload may refer to a cargo or equipment not required for flight, control, and navigation of the UAV. Examples of a payload may include, but are not limited to, a camera, a package, speakers, microphones, projectile ejecting device (e.g., flame retardant, pellets, etc). In some instances, the payload may be related to an overall UAV mission or task (e.g., photography), and the application processing module may be coupled to sensors or devices related to an overall UAV mission or task. In some instances, the application processing module may be coupled to gimbal and/or a gimbal controller. The gimbal may comprise any type of gimbal, e.g., two-axis gimbal, three-axis gimbal, multi-axis gimbal, etc. The gimbal controller may comprise a real-time system, e.g., process input in real time. In some instances, the gimbal controller may be a micro-controller for controlling the servo angle of the gimbal such as a tri-axial gimbal.

Alternatively or in addition, the application processing module may be coupled to a sensor or a device whose data is configured to be transmitted to a user terminal and/or to an operator of the UAV. The application processing module may be coupled to a sensor or a device whose output (e.g., data) does not need to be processed in real time. The output (e.g., data) by the sensor or device coupled to the application processing module may be used for deliberate and/or planned flight (e.g., deliberate or planned automated flight) of the UAV. In some instances, output by the sensor or device coupled to the application processing module may need to undergo substantial processing and/or analysis before it is useful for planned flight of the UAV. For example, images captured by the primary imaging sensor may be processed by the application processing module to extract features of a target which may be tracked as further described herein. In some aspects, the application processing module may comprise a plurality of interfaces and may be amendable to removably coupling to other sensors and/or devices. The various interfaces may comprise USB, UART, I2C, GPIO, I2S, SPI, MIPI, HPI, HDM, LVDS, and the like.

The real-time sensing module may be coupled to sensors or devices that do not have adjustable parameters, or minimally adjustable parameters. In some instances, the real-time sensing module may be coupled to sensors that do not have user adjustable parameters. In some instances, the real-time sensing module may be coupled to sensors that do not have a user interface (e.g., software or hardware) for adjustment of parameters. In some instances, the real-time sensing module may not be coupled to a payload of the UAV. In some instances, the real-time sensing module may not be coupled to a gimbal and/or a gimbal controller. In some instances, the real-time sensing module may be coupled to a sensor or a device whose output (e.g., data) is not configured not to be transmitted to a user terminal and/or to an operator of the UAV.

The real-time sensing module may be coupled to a sensor or a device whose output is processed in real time. The output by the sensor or device coupled to the real-time sensing module may be used for passive autonomous flight (e.g., passive obstacle avoidance, vision based hovering) of the UAV. In some instances, the output by the sensor or device coupled to the real-time sensing module may be used for reactionary flight of the UAV, substantially as described herein. In some instances, output by the sensor or device coupled to the real-time sensing module may need to undergo substantial processing and/or analysis before it is useful for passive flight of the UAV. For example, images captured by secondary imaging sensors (e.g., downward imaging sensor, etc) may be processed by the real-time sensing module for height detection and/or velocity detection. For example, images captured by secondary imaging sensors (e.g., front view imaging sensors) may be processed by the real-time sensing module for map building or obstacle avoidance as further described herein.

As an example, the application processing module 401 may be coupled to a primary imaging sensor 402 with adjustable parameters while the real-time sensing module 403 may be coupled to one or more secondary imaging sensors 404, 406 that do not have adjustable parameters. For example, the application processing module may be coupled to a primary imaging sensor that is a payload of the UAV while the real-time sensing module may be coupled to one or more secondary imaging sensors which are not a payload of the UAV. For example, the application processing module may be coupled to a primary imaging sensor via a gimbal while the real-time sensing module may be coupled to one or more secondary imaging sensors which are embedded in a housing of the UAV. For example, the application processing module may be coupled to a primary imaging sensor whose data (e.g., image data) is transmitted to a user terminal while the real-time sensing module may be coupled to one or more secondary imaging sensors whose data is not transmitted to a user terminal. For example, the application processing module may be coupled to a primary imaging sensor whose output is not processed in real time while the real-time sensing module may be coupled to one or more secondary imaging sensors whose output is processed in real time. The output by the sensor or device coupled to the application processing module may be used for deliberate or planned flight of the UAV while the output by the sensor or device coupled to the real-time sensing module may be used for passive flight of the UAV. In some instances, the application processing module may be coupled to sensors that are not required to be used in flight or control of the UAV while the real-time sensing module may be coupled to at least some sensors whose data needs to be processed in order to obtain information useful for passive flight of the UAV.

The flight control module may be coupled to other sensors or devices. The one or more sensors coupled to the flight control module may be sensors that aid in maintenance of flight of the UAV. In some instances, sensors or devices coupled to the flight control module may be configured to indicate a state of the UAV, e.g., with minimal processing required by the flight control module. In some instances, the state of the UAV may comprise a position, orientation, and/or velocity of the UAV. For example, inertial sensors, barometers, global positioning units may be coupled to the flight control module. In some instances, sensors or devices coupled to the flight control module may be configured to indicate a position of the UAV relative to an object or obstacle (e.g., ground, obstacle, etc). For example, ultrasonic sensors or time of flight sensors may be coupled to the flight control module for indicating a position of the UAV relative to an object or the ground.

As previously described herein, the flight control module may be coupled to one or more ESC controllers. For example, the flight control module may be electronically coupled or connected to one or more ESC controllers. In some instances, the flight control module may be in direct communication with the ESC controllers and may be responsible for ultimate flight control of the UAV. In some aspects, the flight control module may be coupled to a battery system controller. The battery system controller may comprise a micro-controller for controlling battery related system for the UAV. For example, the battery related system for the UAV may comprise battery information display, battery information transmittal, historical information recording, battery defect detection, self-discharging, automatic balancing, and/or charging temperature protection. Alternatively or in addition, the battery system controller may be coupled to other processing modules, e.g., the application processing module or the real-time sensing module.

The different processing modules described throughout may be configured to handle different processing requirements of the UAV as described throughout. For example, the application processing module may process applications or tasks that require an extensive amount of processing power and do not require real-time processing of input. The real-time sensing module may process applications or tasks that require real-time processing of input and/or applications that require an intermediate amount of processing power. The flight control module may process information from sensors in order to maintain stable flight of the UAV and may affect directed and/or passive automated flight as instructed by the real-time processing module and/or the real-time sensing module, e.g., by instructing ESC controllers to affect movement of one or more propulsion units.

The different processing modules may comprise different processing capabilities, e.g., as necessitated by their different functionalities. Processing capabilities as used herein may be measured by a clock speed and/or a floating-point operations per second capable by the different processing modules. In some instances, the processing power of the application processing module may be equal to or greater than about 10%, 15%, 20%, 25%, 40%, 60%, 80%, 100%, 125%, 150%, 175%, 200%, 250%, 300% or more than the processing power of the real-time sensing module. In some instances, the processing power of the application processing module may be equal to or greater than about 10%, 15%, 20%, 25%, 40%, 60%, 80%, 100%, 125%, 150%, 175%, 200%, 250%, 300% or more than the processing power of the flight control module. In some instances, the processing power of the real-time sensing module may be equal to or greater than about 10%, 15%, 20%, 25%, 40%, 60%, 80%, 100%, 125%, 150%, 175%, 200%, 250%, 300% or more than the processing power of the flight control module.

The division of the functionalities between the different modules may enable efficient use of UAV resources and enable enhanced UAV functionalities. Various functions of the UAV may be implemented using the different processing modules, or a subset of the processing modules. FIG. 5 illustrates different flight related functions 500 which require functioning, or processing by different modules, in accordance with embodiments. The different processing modules may be selectively used depending on the functionality desired of the UAV. For example, the flight control module may be sufficient to enable stable flight 501 of the UAV. In some instances, the flight control module may process a state of the UAV and maintain stable flight of the UAV based on sensor data (e.g., inertia sensor, compass, barometer, GPS, ultrasonic sensor, and/or TOF sensor data) directly coupled to the flight control module. The stable flight may be maintained with or without aid of other processing modules such as the application processing module or the real-time sensing module.

In some instances, the flight control module may lack processing power required to implement certain functionalities of the UAV. The real-time sensing module and/or the application processing module may work together with the flight control module in situations where additional processing power is required and/or helpful. In some instances, the real-time sensing module may process data when real-time processing of information is necessary or helpful. For example, the UAV may be required to autonomously, or passively, react to external objects or obstacles based in real time. In such cases, the UAV may implement vision based hovering 503 and/or passive obstacle avoidance 505 with aid of the real-time sensing module and the flight control module.

In some instances, the application processing module may process data when real-time processing of information is unnecessary and/or the processing requirements are particularly burdensome. For example, the UAV may be required to extract features from images for target tracking or follow waypoints according to designated points (e.g., locations) and instructed operations. In such cases, the UAV may implement the target tracking 507 and/or waypoint flight 509 with aid of the application processing module and the flight control module.

In some instances, the application processing module may work with the real-time sensing module and the flight control module where necessary or helpful. For example, the real-time sensing module may acquire relevant data from one or more sensors directly coupled to it and process the data in real time. The processed data may be transmitted to the application processing module which may further process the data to gain additional data or information. For example, the real-time sensing module may calculate a parallax data based on data from one or more sensors. The real-time sensing module may further transmit the parallax data to the application processing module which may generate a grid map based in part on the parallax data and plan a trajectory in which no obstacle is found to implement a tap and go feature 511. In some instances, the real-time sensing module may be operative at all times and may govern passive flight features of the UAV. For example, while the real-time sensing module may not be required in implementing tracking 507 or waypoint flight 509, it may nevertheless function to ensure that the UAV is avoiding obstacles while tracking a target or navigating along waypoints. Alternatively, the real-time sensing module may be optionally turned on or off depending on user preference or depending on a functionality or operation required of the UAV.

The following UAV features below illustrate specific features implemented by different processors. The features listed below are meant to be exemplary and it is to be understood that various other features not listed may be implemented efficiently, or enabled by the disclosure provided herein.

Vision Based Hovering

Figure 6:
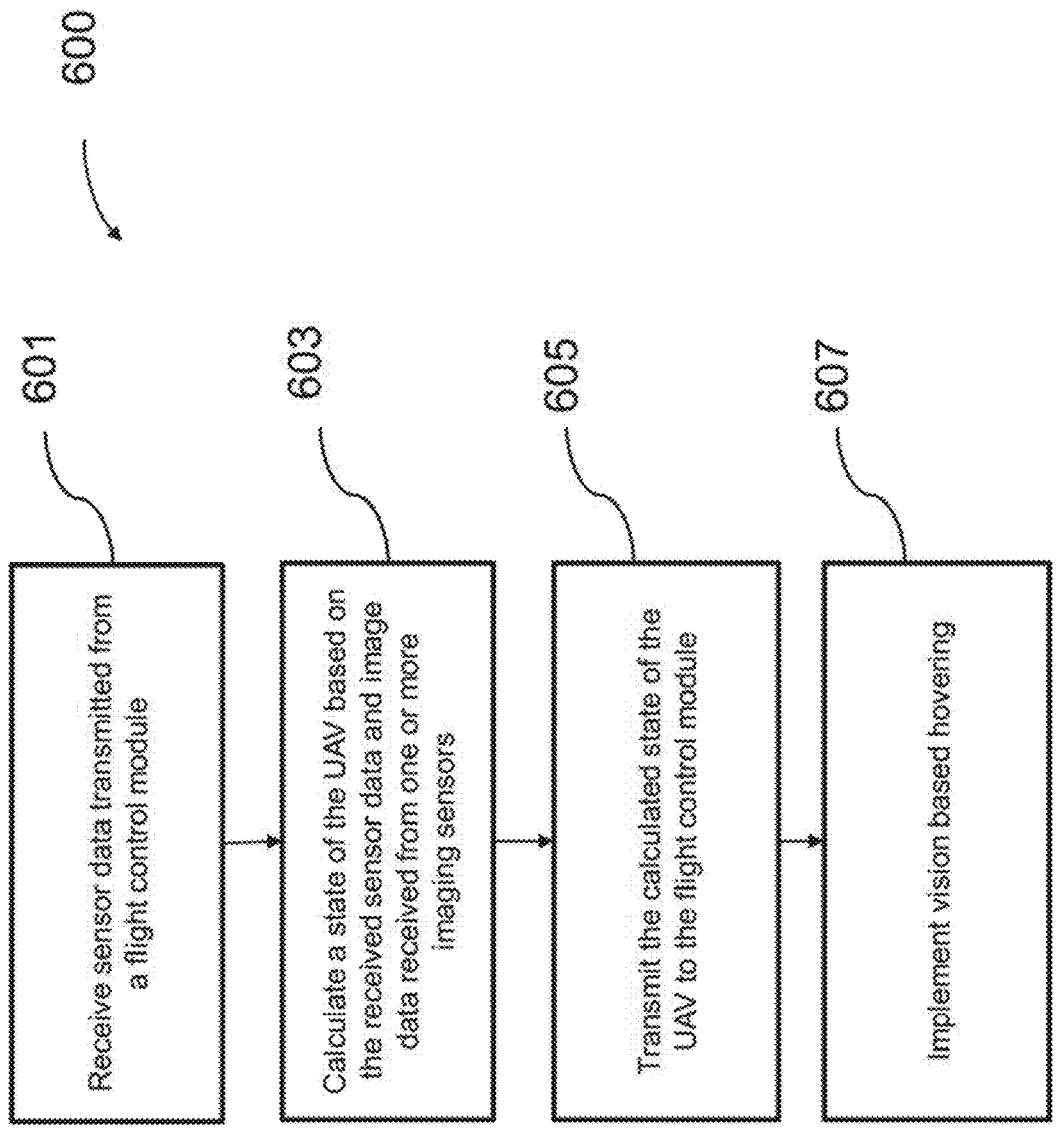
FIG. 6 illustrates a method 600 of implementing vision based hovering for the UAV, in accordance with embodiments.

In some instances, the real-time processing module together with the flight control module may enable a vision based hovering function for the UAV. Vision based hovering may refer to hovering of the UAV based at least in part on image data. For example, vision based hovering function of the UAV may ensure that the UAV is above a floor or below a ceiling by at least a predetermined threshold based on image data acquired by one or more imaging sensors (e.g., secondary imaging sensors). FIG. 6 illustrates a method 600 of implementing vision based hovering for the UAV, in accordance with embodiments. The vision based hovering feature may require real-time processing and may place a large computational cost on processors. In step 601, the real-time sensing module may receive sensor data of the UAV transmitted by a flight control module. In some instances, the sensor data may comprise attitude information of the UAV. The UAV attitude information may be measured by one or more sensors coupled to the flight control module, e.g., an inertial sensor. In step 603, the real-time sensing module may calculate a state of the UAV based on (1) the received sensor data, and (2) image data obtained from one or more imaging sensors coupled to the real-time sensing module. The received sensor data may comprise raw sensor data. Alternatively or in addition, the received sensor data may comprise processed sensor data. For example, raw sensor data may be processed by the flight control module before being transmitted to the real-time sensing module. In some instances, the state of the UAV may comprise a height and/or velocity of the UAV. The one or more imaging sensors coupled to the UAV may comprise downward imaging sensors embedded in a frame of the UAV as previously described herein. Optionally, in order to calculate the state of the UAV more accurately and reliably, the real-time sensing module may perform sensor data fusion with additional sensor data prior to calculating a state of the UAV. For example, additional sensor data such as ultrasonic data, barometer data, GPS data, or TOF data may be utilized by the real-time sensing module in calculating the height or velocity of the UAV. In some instances, the data fusion may be performed by the flight control module, e.g., prior to being transmitted to the real-time sensing module. In step 605, the calculated state of the UAV may be transmitted to the flight control module. In step 607, based on the calculated state, the flight control module may send one or more instructions to an ESC controller to implement vision based hovering.

Passive Obstacle Avoidance

Figure 7:
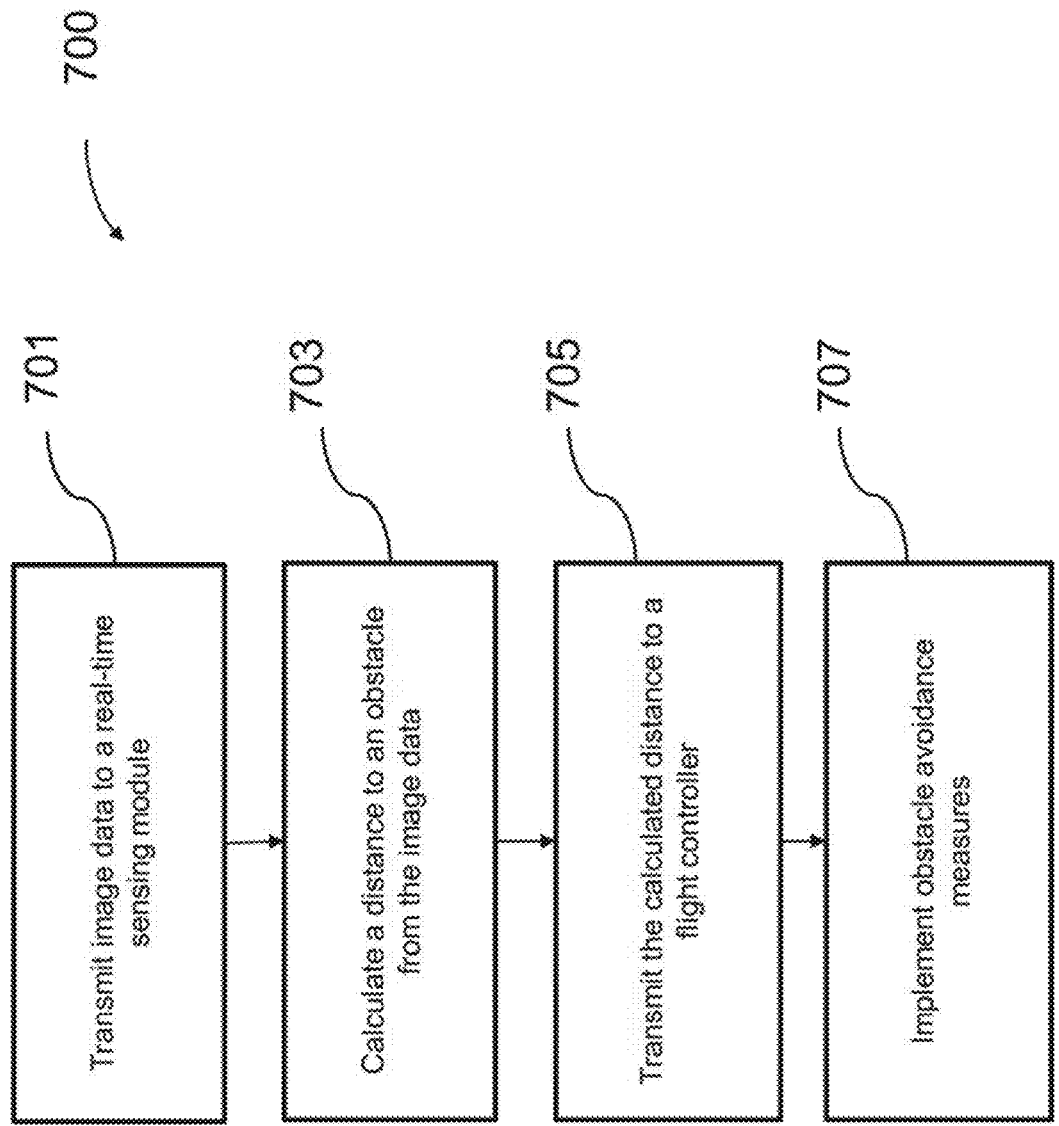
FIG. 7 illustrates a method of implementing passive obstacle avoidance for the UAV, in accordance with embodiments.

In some instances, the real-time processing module together with the flight control module may enable a passive obstacle avoidance function for the UAV. Passive obstacle avoidance may refer to autonomous avoidance of obstacles by the UAV during flight of the UAV. In some instances, passive obstacle avoidance may comprise lateral movement of the UAV to avoid obstacles. In some instances, passive obstacle avoidance may comprise vertical movement of the UAV to avoid obstacles. FIG. 7 illustrates a method 700 of implementing passive obstacle avoidance for the UAV, in accordance with embodiments. The passive obstacle avoidance feature may require real-time processing and may place a large computational burden on processors. In step 701, image data collected by imaging sensors (e.g., front view binocular sensors) may be transmitted to a real-time sensing module. In some instances, the imaging sensors may be secondary imaging sensors directly coupled to the real-time sensing module, e.g., front view binocular sensors. The image data may comprise information regarding an obstacle in a flight path of the UAV. In step 703, the real time sensing module may calculate a distance to an obstacle from the image data. In step 705, the real-time sensing module may transmit the calculated distance to a flight controller. In step 707, based on the calculated distance, the flight controller may change a trajectory of the flight path, or a speed of the UAV, e.g., by sending one or more instructions to the ESC controller. In some instances, the obstacle avoidance measure may be to stop or hover the UAV in a stable position. Optionally, in order to calculate a distance to the obstacle more accurately and reliably, the real-time sensing module may perform sensor data fusion with additional sensor data prior to calculating a distance to the obstacle. For example, data from additional sensors such as TOF sensors provided on various locations of the UAV (e.g., on the left, right, rear, front, and top sides of the UAV) may be utilized by the real-time sensing module in calculating a distance from the UAV to the obstacle. The TOF sensors may be directly coupled to the real time sensing module and/or the flight control module.

Tracking

In some instances, the application processing module together with the flight control module may enable a tracking function for the UAV. The tracking function may comprise an image based tracking function. For example, based on discernable features of an object within an image data, the UAV may be capable of tracking a target. In some instances, the tracking function may place an extensive computational burden on processors. For example, an imaging device (e.g., primary imaging sensor) may capture one or more images. The images may be transmitted to an application processing module (e.g., GPU of the application processing module or GPU coupled to application processing module) which may perform feature extraction on the image data, e.g., on board the UAV.

In some instances, the feature extraction may be used to identify potential targets (e.g., target objects) to track. For example, a plurality of feature points may be identified. A feature point can be a portion of an image (e.g., an edge, corner, interest point, blob, ridge, etc.) that is uniquely distinguishable from the remaining portions of the image and/or other feature points in the image. Optionally, a feature point may be relatively invariant to transformations of the imaged object (e.g., translation, rotation, scaling) and/or changes in the characteristics of the image (e.g., brightness, exposure). A feature point may be detected in portions of an image that is rich in terms of informational content (e.g., significant 2D texture). A feature point may be detected in portions of an image that are stable under perturbations (e.g., when varying illumination and brightness of an image). Feature detection as described herein can be accomplished using various algorithms which may extract one or more feature points from image data.

Figure 8:
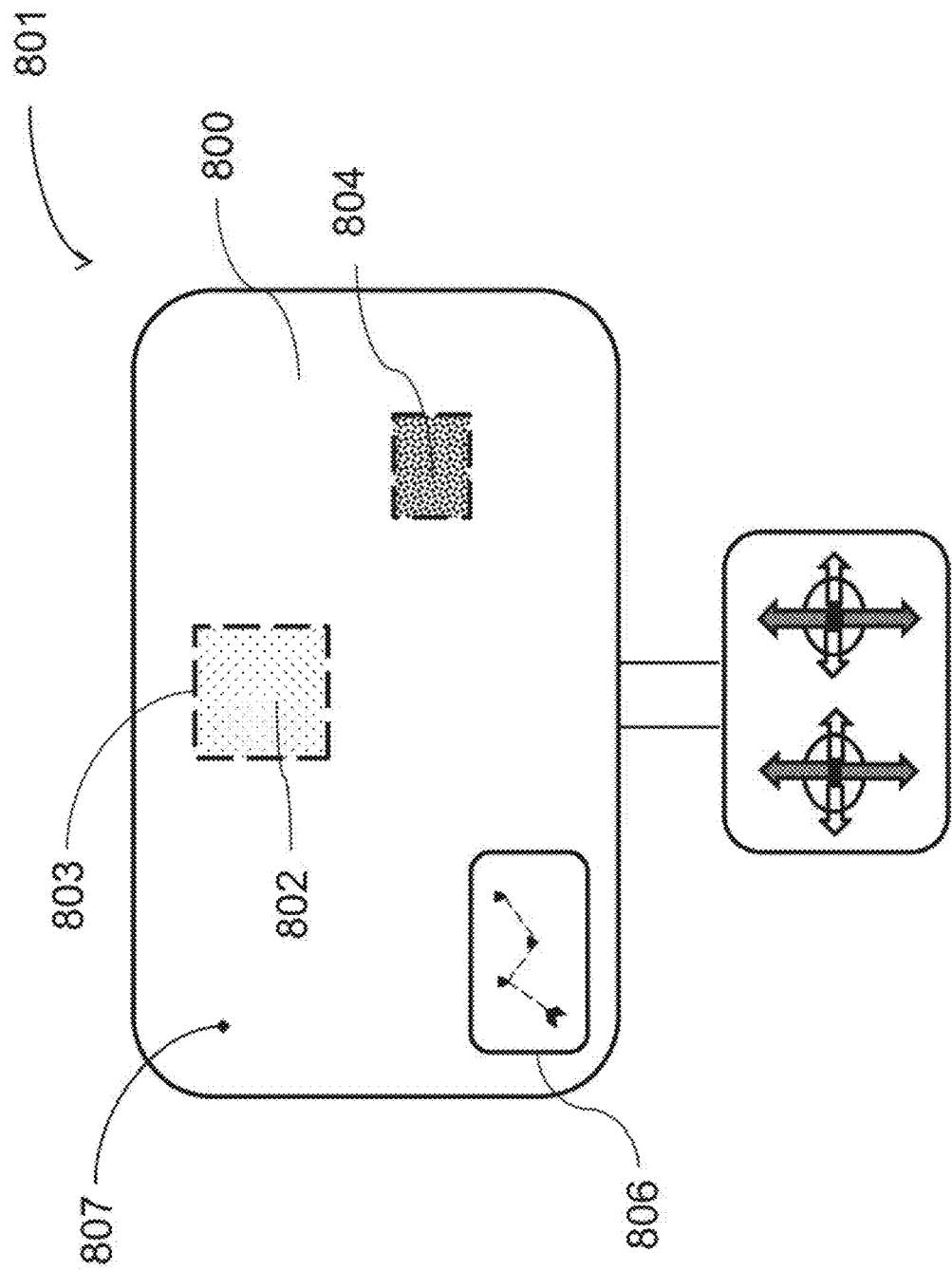
FIG. 8 illustrates an image on a user terminal, in accordance with embodiments.

The algorithm may be an edge detection algorithm, a corner detection algorithm, a blob detection algorithm, or a ridge detection algorithm. In some embodiments, the corner detection algorithm may be a "Features from accelerated segment test" (FAST). In some embodiments, the feature detector may extract feature points and calculate a feature point number using FAST. In some embodiments, the feature detector can be a Canny edge detector, Sobel operator, Harris & Stephens/Plessy/Shi-Tomasi corner detection algorithm, the SUSAN corner detector, Level curve curvature approach, Laplacian of Gaussian, Difference of Gaussians, Determinant of Hessian, MSER, PCBR, or Grey-level blobs, ORB, FREAK, or suitable combinations thereof. The identified feature points may be utilized in constructing a boundary 803 around the target as shown in FIG. 8.

In some instances, the images, or processed images may be sent to a user terminal which may be viewed by an operator or a user. FIG. 8 illustrates an image 800 on a user terminal 801, in accordance with embodiments. The image may comprise potential targets 802, 804 that were identified via feature extraction. A user may select a target object to be tracked. For example, the user may tap on target 802, using an appendage, stylus, etc.

Meanwhile, the UAV may continue capturing images. In the images, an optimal feature match may be searched for. In some instances, the optimal feature match may be searched for by the application processing module and/or image processing module. Alternatively or in addition, the optimal feature match may be searched for by other processing modules such as the real-time sensing module. For example, in a sequence of images, feature extraction may be performed and be used for identifying the same target selected to be tracked. Once the target is identified, the application processing module may generate a trajectory based upon the position of the target object on the image. In some instances, the application processing module may generate the trajectory additionally based upon other information, e.g., the latest grid map available to the UAV. Relevant signals may be generated and/or sent to the flight control module to further affect actual tracking via instructions sent to the one or more propulsion mechanisms on board the UAV from the flight control module. Alternatively or in addition, relevant signals may be generated and/or sent to the gimbal controller and/or imaging device to affect actual tracking of the target. For example, a state (e.g., position, zoom, etc) of the imaging device (e.g., primary imaging sensor) on board the UAV may be varied in order to implement the tracking feature.

In some instances, a distance between the UAV and the target object may be maintained at a predetermined distance, e.g., along the planned trajectory for tracking. In some instances, the distance between the UAV and the target object may be user configurable. In some instances, the predetermined distance may be equal to, or less than about 5000 m, 2000 m, 1000 m, 500 m, 200 m, 150 m, 100 m, 75 m, 50 m, 40 m, 30 m, 20 m, 10 m, or 5 m. In some instances, a relative position of the target object within the captured image may be kept constant. For example, the target object may be kept in a center of the image. In some instances, this may be implemented via flight control module affecting movement of the UAV. Alternatively or in addition, this may be implemented via gimbal controller affecting a movement of the gimbal to adjust a position of the imaging device. In some instances, a relative size of the target object within captured images may be kept constant. For example, the target object may occupy a set number of pixels within the image. In some instances, this may be implemented via flight control module affect movement of the UAV. Alternatively or in addition, this may be implemented via varying parameters of the imaging device such as a zoom of the imaging device. During the tracking, a height of UAV may be maintained at a predetermined distance. In some instances, the UAV may move laterally (e.g., sideways, forward, or backward) while tracking a target. In some instances, TOF sensors provide at sides of the UAV may provide anti-collision protection.

Waypoint Flight

In some instances, the application processing module together with the flight control module may enable a waypoint flight function for the UAV. The waypoint flight may refer to directed autonomous flight to one or more target locations. The one or more target locations may be selected by a user, e.g., on a map 806. Alternatively, there may be a preconfigured set of target locations amongst which the UAV may autonomously fly along. The waypoint flight feature may require less real-time processing, and may be implemented by the image processor, the task processor and the flight controller. After determination of the waypoints (e.g., by user selection) the application processing module may send generate and send relevant signals to the flight control module for the UAV to follow the waypoints based upon the recorded waypoints.

One Key Panorama

In some instances, during the flight (e.g., autonomous flight), the application processing module may control the image processing module to capture images, videos, etc. In addition, the application processing module may generate and/or transmit signals to the flight control module to rotate the UAV. A sequence of images captured during this operation may be stitched into a panoramic image. In some instances, this feature may be affected by a single set of instructions from a user or operator of the UAV. For example, a user may provide an input (e.g., touch a screen, push a button, etc) and the UAV may implement the feature. In some instances, the one key panorama feature may require less real-time processing.

Active Obstacle Avoidance

Under the tap and go feature, tapping on a portion of a user interface may cause a UAV to autonomously fly towards the target. The target may comprise a target location (e.g., on a map, in a three dimensional space, etc) or a target object. For example, by tapping on portion 807 of the image 800, a user may cause the UAV to autonomously fly towards location 807 in a three dimensional space. For example, by tapping on a portion of the map 806, a user may cause the UAV to autonomously fly towards the coordinates of the tapped location. For example, by tapping on an object 804, the user may cause the UAV to autonomously fly towards the target object.

In some instances, the tap and go feature may be implemented with aid of the real-time sensing module, the application processing module, and the flight control module. This feature requires huge computational cost but less real-time processing. In some instances, a user may tap on a portion of the map 806, e.g. on a user interface or a user terminal. Meanwhile, the real-time sensing module may receive image information obtained by the secondary imaging sensors (e.g., front view binocular sensors) and calculate a parallax data. The parallax data may be transmitted to the application processing module. The application processing module may generate a grid map. For example, the grid may be generated based on output or data transmitted from the real-time sensing module. The application processing module may further plan a trajectory to the tapped location along a direction on which no obstacle is found based in part on the parallax data. Subsequently, a control instruction may be generated and sent to the flight control module which may affect actual flight of the UAV along the planned trajectory. The flight along the trajectory which avoids potential obstacles may comprise an active obstacle avoidance feature of the UAV, implemented with aid of the real-time sensing module, the application processing module, and the flight control module.

Figure 10:
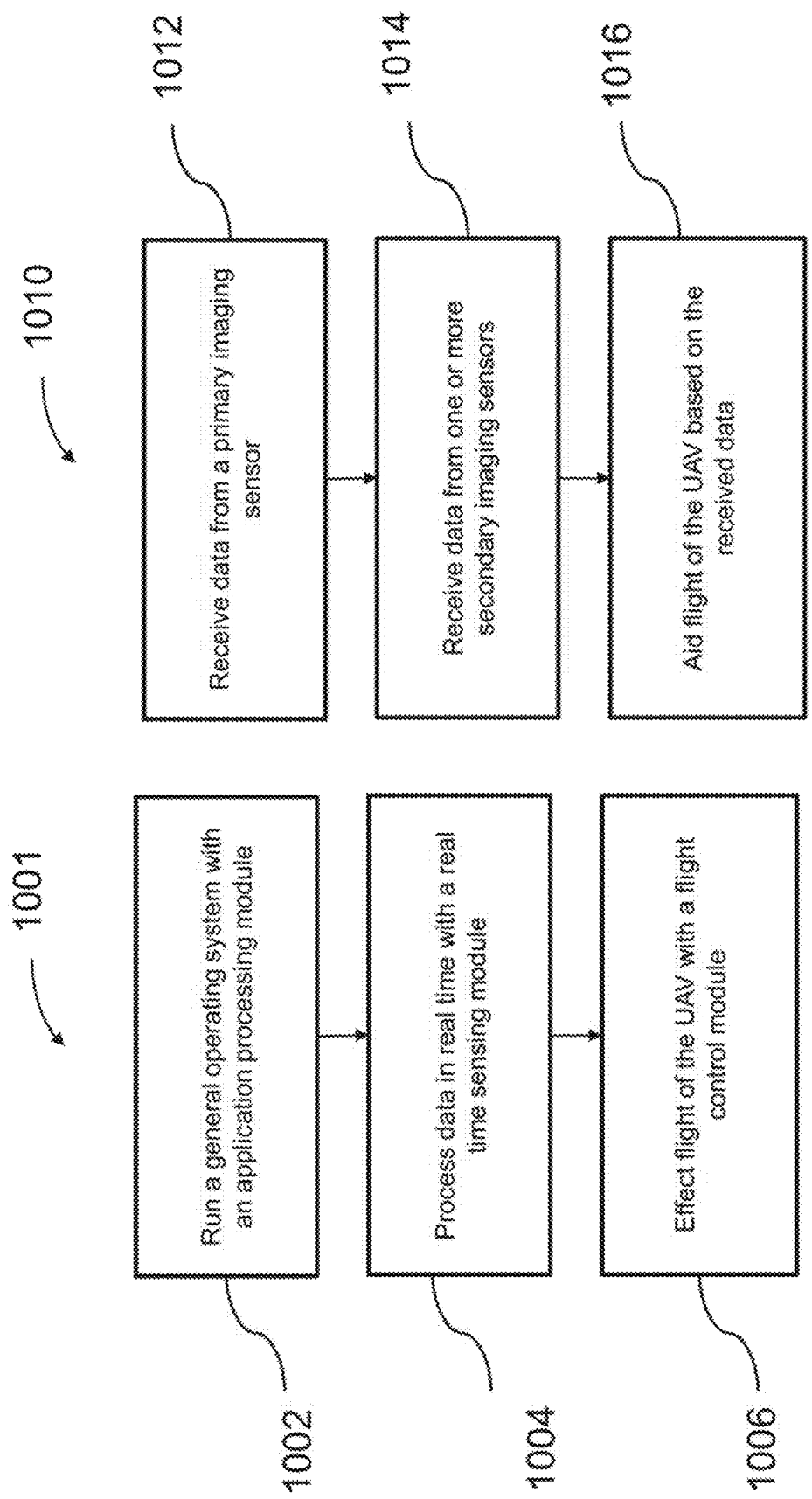
FIG. 10 illustrates methods for managing flight of an unmanned aerial vehicle, in accordance with embodiments.

FIG. 10 illustrates methods for managing flight of an unmanned aerial vehicle, in accordance with embodiments. Substantially as described throughout, the present disclosure may provide a method 1001 for managing flight of a UAV. The method may comprise a step 1002 of running an operating system with aid of an application module. In some instances, the operating system may be a non-real time operating system and/or may comprise a general operating system. In step 1004, data may be processed in real time with aid of a real-time sensing module. In some instances, the data may be processed without aid of the operating system. The real-time sensing module may be in direct communication with the application processing module. In step 1006, flight of the UAV may be effected with aid of one or more propulsion units. The one or more propulsion units may be controlled by a flight control module which may be in direct communication with the application processing module and the real-time sensing module. In some instances, the flight control module may be in direct communication with one or more ESC controllers and may control one or more propulsion units that effect flight of the UAV. The different processing modules may be provided on board the UAV. Alternatively, some of the processing modules may be provided off-board the UAV, e.g., on a ground terminal.

In some instances, a subset of the different processing modules may implement a predetermined function of the UAV. The predetermined function may be a feature enabled by the UAV hardware architecture of the present disclosure. For example, two of the application processing module, real-time sensing module, and a flight control module may implement a predetermined function of the UAV. In some instances, the predetermined function may comprise simultaneous localization and mapping (SLAM). For example, the application processing module may comprise capabilities to build a map (e.g., two dimensional or three dimensional map) and a location of the UAV's location within the map may be kept track of, e.g., with aid of various sensors. In some instances, the predetermined function may comprise vision-based hovering, passive obstacle avoidance, tracking, or waypoint flight substantially as described throughout.

In some instances, the two of the three modules may include the application processing module and the flight control module. In some instances, the subset of the different processing modules may exclude the real-time sensing module. This may be in instances there the predetermined function does not require real-time processing. For example, in implementing features which require planning ahead, real time processing of data may not be critical. In some instances, the predetermined function may not require real-time processing for directed or planned autonomous flight features, e.g., target tracking or waypoint flight. Target tracking or waypoint flight may comprise directed or planned autonomous flight features because a user may deliberately provide instructions for the UAV to undergo the autonomous flight, e.g., to accomplish target tracking or waypoint flight.

In some instances, two of the three modules may include the real-time sensing module and the flight control module. This may be in instances where the predetermined function requires real-time processing. For example, in implementing features which are reactionary in nature, real time processing of data may be of importance. In some instances, the predetermined function may require real-time processing for passive autonomous flight features, e.g., vision based hovering or passive obstacle avoidance. Vision based hovering or passive obstacle avoidance may comprise passive autonomous flight features because the UAV may passively implement the flight features without user input.

In some instances, all three modules (e.g., the application processing module, the real-time sensing module, and the flight control module) may implement a function of the UAV. The function of the UAV may comprise an active autonomous flight feature, e.g., trajectory planning so as to avoid obstacles and subsequent obstacle avoidance.

In some instances, the different processing modules may be further coupled to an image processor and/or an image transmission processor, substantially as described elsewhere. The image processor or the image transmission processor may, individually or collectively with the application processing module, implements a predetermined function of the UAV. In some instances, the predetermined function may be related to image capturing or image data captured by an imaging sensor. For example, the predetermined function may be image capture, data encoding, or panoramic image stitching.

In some instances, a system may be provided for implementing the method 1001. The system may comprise an application processing module configured to run an operating system, a real-time sensing module in communication with the application processing module, the real-time sensing module configured to process data in real time, and a flight control module in direct communication with the application processing module and the real-time sensing module, the flight control module further configured to control one or more propulsion units that effect flight of the UAV.

In some instances, a UAV may be provided for implementing the method 1001. The UAV may comprise one or more propulsion units that effect flight of the UAV, an application module configured to run an operating system, a real-time sensing module in communication with the application processing module, the real-time sensing module configured to process data in real time; and, a flight control module in direct communication with the application processing module and the real-time sensing module, the flight control module further configured to control the one or more propulsion units.

In some instances, a non-transitory computer readable medium for managing flight of an unmanned aerial vehicle (UAV) may be provided for implementing the method 1001. The non-transitory computer readable medium comprising code, logic, or instructions to run an operating system with aid of an application module, process data in real time with aid of a real-time sensing module in communication with the application processing module, and effect flight of the UAV with aid of one or more propulsion units, the one or more propulsion units controlled by a flight control module in direct communication with the application processing module and the real-time sensing module.

Substantially as described throughout, the present disclosure may provide another method 1010 for managing flight of a UAV. The method may comprise a step 1012 of receiving data, at an application processing module, from a primary imaging sensor. The primary imaging sensor may be configured to capture data according to instructions from a user. In step 1014, data may be received at a real-time sensing module. The received may be transmitted from one or more secondary imaging sensors. The primary imaging sensor and/or secondary sensors may be located on board the UAV. In some instances, the one or more secondary imaging sensors may be configured to capture data autonomously, e.g., without input from a user. Subsequently, in step 1016, data processed by the application processing module or the real-time sensing module may be used to aid flight of the UAV.

In some instances, the primary imaging sensor may be coupled to a carrier. In some instances, the carrier may refer to a carrier of a payload. In some instances, the carrier may be a gimbal, substantially as described herein (e.g., multi-axis, 3-axis, etc). In some instances, the application processing module may be coupled directly to a carrier controller, which may be configured to affect movement of the carrier. In some instances, the application processing module may generate or relay one or more control signals to the carrier controller to affect movement of the carrier.

The application processing module may be substantially as described throughout. For example, the application processing module may be configured to run an operating system. The operating system may be a non-real time operating system. In some instances, the non-real time operating system may comprises a general purpose operating system that can run a variety of applications, depending on mission objectives or user preference.

In some instances, additional processing modules may be provided. For example, an image module may be provided and may be operably coupled to the application processing module. The image module may comprise an image processor and an image transmission processor. In some instances, the image module, or its components, may be integrated into the application processing module. Alternatively, the image module, or its components, may not be integrated into the application processing module. In some instances, the image module, individually or collectively with the application processing module, may implement a predetermined function of the UAV. The predetermined function may be related to image capturing or image data captured by the primary imaging sensor. For example, the predetermined function may comprise image capture, data encoding, and panoramic image stitching.

In some instances, a flight control module may be provided for controlling one or more propulsion units on board the UAV. In some instances, the data from the primary imaging sensor may be configured to be shown on a user terminal in communication with the UAV. In some instances, the application processing module may be configured to extract features from the data received from the primary imaging sensor. Additionally, the application processing module may be utilized in video encoding, system upgrades, or enabling system interoperability and may further provide various interfaces for inter-device connectivity.

In some instances, the real-time sensing module may be configured to calculate a state of the UAV from the data received from the secondary imaging sensors. The state of the UAV may include a height or velocity of the UAV. After calculation by the real-time sensing module, the calculated height or velocity of the UAV may be utilized in sensor data fusion with other data from other sensors. In some instances, the other data from other sensors may originate from sensors directly in communication with the real-time sensing module. Alternatively or in addition, the other data from the sensors may originate from sensors in direct communication with a flight control module. In some instances, the other data may comprise ultrasonic data, barometer data, GPS data, or time of flight (TOF) data. The real-time sensing module and/or the flight control module may be configured, or be capable of undertaking the sensor data fusion.

In some instances, a system may be provided for implementing the method 1010. The system may comprise an application processing module configured to receive data from a primary imaging sensor, wherein the primary imaging sensor captures data according to instructions from a user, and a real-time sensing module configured to receive data from one or more secondary imaging sensors, wherein the one or more secondary imaging sensor captures data autonomously, and wherein data processed by the application processing module or the real-time sensing module is used to aid flight of the UAV.

In some instances, a UAV may be provided for implementing the method 1010. The UAV may comprise one or more propulsion units that effect flight of the UAV, an application processing module configured to receive data from a primary imaging sensor, wherein the primary imaging sensor captures data according to instructions from a user, and a real-time sensing module configured to receive data from one or more secondary imaging sensors, wherein the one or more secondary imaging sensor is configured to capture data autonomously, and wherein data processed by the application processing module or the real-time sensing module is used to aid flight of the UAV.

In some instances, a non-transitory computer readable medium may be provided for managing flight of an unmanned aerial vehicle (UAV). The non-transitory computer readable medium may comprise code, logic, or instructions to receive data, at an application processing module, from a primary imaging sensor, wherein the primary imaging sensor captures data according to instructions from a user, and receive data, at a real-time sensing module, from one or more secondary imaging sensors, wherein the one or more secondary imaging sensor is configured to capture data autonomously, and wherein data processed by the application processing module or the real-time sensing module is used to aid flight of the UAV.

The systems provided herein may enable a hardware architecture of the UAV to operate with improved efficiency, improve operational capabilities of the UAV, and enable novel features to be undertaken. By providing different processing modules to process different types of data and communicate with one another directly to implement UAV features, the UAV system may be able to efficiently divide up processing of data between the application processing module and real-time sensing module. In addition, all necessary processing of data may be undertaken on board the UAV. Direct communication between the different processing modules may ensure that data which requires real time processing and data that does not are both processed efficiently. The differential coupling of sensors may ensure that relevant information is directed to the relevant processing modules. The aforementioned may be enabled, amongst other things, by the application processing module. As the core of the UAV hardware architecture, the application processing module may provide powerful processing capabilities, modularity to the UAV system, and security to the entire UAV system.

The systems, devices, and methods described herein can be applied to a wide variety of movable objects. As previously mentioned, any description herein of an aerial vehicle may apply to and be used for any movable object. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 11:
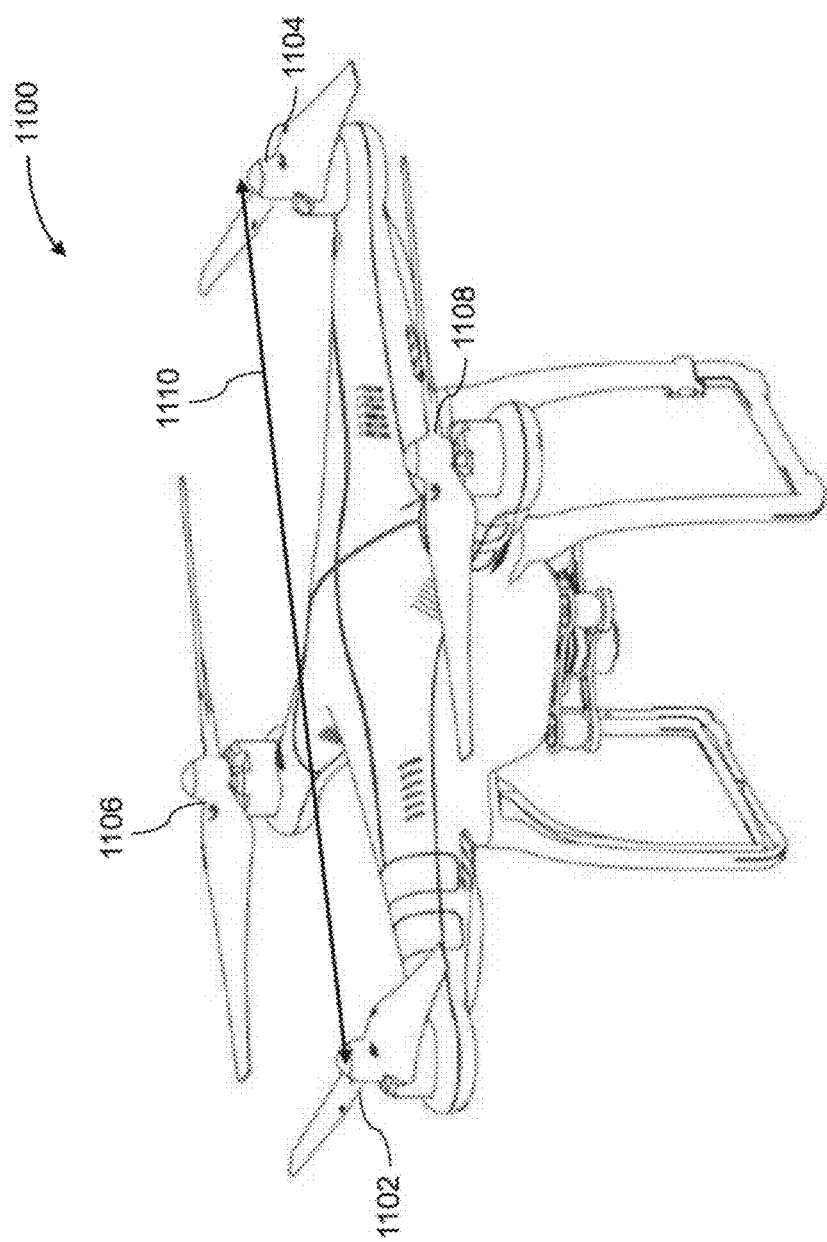
FIG. 11 illustrates an unmanned aerial vehicle (UAV), in accordance with embodiments.

FIG. 11 illustrates an unmanned aerial vehicle (UAV) 1100, in accordance with embodiments. The UAV may be an example of a movable object as described herein, to which the method and apparatus of discharging a battery assembly may be applied. The UAV 1100 can include a propulsion system having four rotors 1102, 1104, 1106, and 1108. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1110. For example, the length 1110 can be less than or equal to 2 m, or less than equal to 5 m. In some embodiments, the length 1110 can be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

Figure 12:
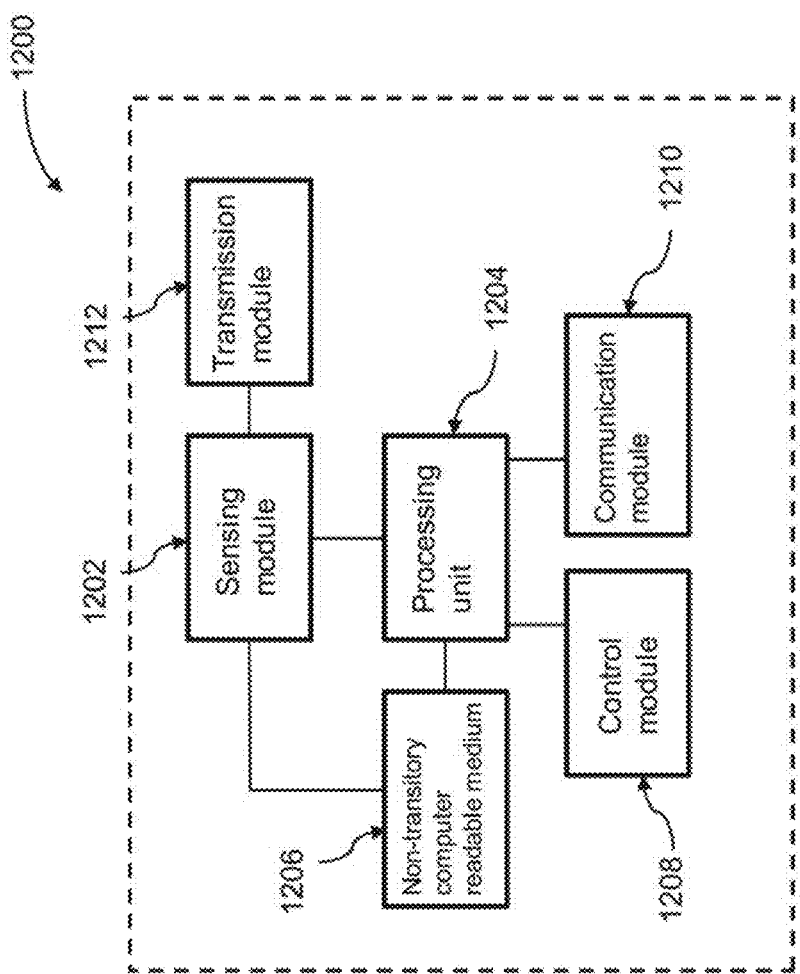
FIG. 12 is a schematic illustration by way of block diagram of a system for controlling a movable object, in accordance with embodiments.

FIG. 12 is a schematic illustration by way of block diagram of a system 1200 for controlling a movable object. The system 1200 may be an example of a simplified UAV hardware architecture without distinction between different processing modules described herein. The system 1200 can include a sensing module 1202 (also referred to as a "sensing circuit"), processing unit 1204 (also referred to as "processing circuit"), non-transitory computer readable medium 1206, control module 1208 (also referred to as "control circuit"), and communication module 1210 (also referred to as "communication circuit").

The sensing module 1202 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/ image sensors (e.g., a camera). The sensing module 1202 can be operatively coupled to a processing unit 1204 having a plurality of processors. In some embodiments, the sensing module can be operatively coupled to a transmission module 1212 (also referred to as a "transmission circuit" or "transmitter," e.g., a Wi-Fi image transmission module) configured to directly transmit sensing data to a suitable external device or system. For example, the transmission module 1212 can be used to transmit images captured by a camera of the sensing module 1202 to a remote terminal.

The processing unit 1204 can have one or more processors, such as a programmable processor (e.g., a central processing unit (CPU)). The processing unit 1204 can be operatively coupled to a non-transitory computer readable medium 1206. The non-transitory computer readable medium 1206 can store logic, code, and/or program instructions executable by the processing unit 1204 for performing one or more steps. The non-transitory computer readable medium can include one or more memory units (e.g., removable media or external storage such as an SD card or random access memory (RAM)). In some embodiments, data from the sensing module 1202 can be directly conveyed to and stored within the memory units of the non-transitory computer readable medium 1206. The memory units of the non-transitory computer readable medium 1206 can store logic, code and/or program instructions executable by the processing unit 1204 to perform any suitable embodiment of the methods described herein. For example, the processing unit 1204 can be configured to execute instructions causing one or more processors of the processing unit 1204 to analyze sensing data produced by the sensing module. The memory units can store sensing data from the sensing module to be processed by the processing unit 1204. In some embodiments, the memory units of the non-transitory computer readable medium 1206 can be used to store the processing results produced by the processing unit 1204.

In some embodiments, the processing unit 1204 can be operatively coupled to a control module 1208 configured to control a state of the movable object. For example, the control module 1208 can be configured to control the propulsion mechanisms of the movable object to adjust the spatial disposition, velocity, and/or acceleration of the movable object with respect to six degrees of freedom. Alternatively or in combination, the control module 1208 can control one or more of a state of a carrier, payload, or sensing module.

The processing unit 1204 can be operatively coupled to a communication module 1210 configured to transmit and/or receive data from one or more external devices (e.g., a terminal, display device, or other remote controller). Any suitable means of communication can be used, such as wired communication or wireless communication. For example, the communication module 1210 can utilize one or more of local area networks (LAN), wide area networks (WAN), infrared, radio, Wi-Fi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1210 can transmit and/or receive one or more of sensing data from the sensing module 1202, processing results produced by the processing unit 1204, predetermined control data, user commands from a terminal or remote controller, and the like.

The components of the system 1200 can be arranged in any suitable configuration. For example, one or more of the components of the system 1200 can be located on the movable object, carrier, payload, terminal, sensing system, or an additional external device in communication with one or more of the above. Additionally, although FIG. 12 depicts a single processing unit 1204 and a single non-transitory computer readable medium 1206, one of skill in the art would appreciate that this is not intended to be limiting, and that the system 1200 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1200 can occur at one or more of the aforementioned locations.

As used herein A and/or B encompasses one or more of A or B, and combinations thereof such as A and B. It will be understood that although the terms "first," "second," "third" etc. may be used herein to describe various elements, components, regions and/or sections, these elements, components, regions and/or sections should not be limited by these terms. These terms are merely used to distinguish one element, component, region or section from another element, component, region or section. Thus, a first element, component, region or section discussed below could be termed a second element, component, region or section without departing from the teachings of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the figures. It will be understood that relative terms are intended to encompass different orientations of the elements in addition to the orientation depicted in the figures. For example, if the element in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the element in one of the figures were turned over, elements described as "below" or "beneath" other elements would then be oriented "above" the other elements. The exemplary terms "below" or "beneath" can, therefore, encompass both an orientation of above and below.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. An unmanned aerial vehicle (UAV) comprising:
   one or more propulsion units that effect flight of the UAV;
   a gimbal;
   a primary imaging sensor carried by the gimbal and being configured to obtain primary image data;
   a secondary imaging sensor being not carried by the gimble and being configured to obtain secondary image data;
   an application processing circuit configured to:
      verify a validity of a system image of the UAV in a secure environment, the system image of the UAV including a state of the UAV that includes a state of an operating system of the UAV; and
      process the primary image data;
   a real-time sensing circuit coupled to the secondary imaging sensor and being configured to process the secondary image data in a real time manner; and
   a flight control circuit operably coupled to the application processing circuit, generation and/or transmission of control signals from the flight control circuit to one or more electronic speed controllers (ESC controllers) being prevented prior to verification of the validity of the system image, and the flight control circuit being configured to:
      communicate, through a first communication channel, with the application processing circuit to receive the processed primary image data from the application processing circuit, and use the processed primary image data to control the UAV to perform a tracking function; and
      communicate, through a second communication channel, with the real-time sensing circuit to receive the processed secondary image data from the real-time sensing circuit, and use the processed secondary image data to control the UAV to perform a passive autonomous flight;
      wherein the first communication channel is independent from the second communication channel.

2. The UAV of claim 1, wherein the application processing circuit is configured to verify the validity of the system image when the UAV is powering up.

3. The UAV of claim 1, wherein the application processing circuit is further configured to verify and record login information of a user in the secure environment before flight of the UAV is allowed.

4. The UAV of claim 1, wherein the application processing circuit is configured to receive data from an imaging sensor and store the data in the secure environment.

5. The UAV of claim 4, wherein the application processing circuit is further configured to encrypt the data before transmission of the data to a storage medium.

6. The UAV of claim 1, wherein the application processing circuit is configured to verify one or more signals received from an external source.

7. The UAV of claim 6, wherein the one or more signals include control signals received from a ground terminal.

8. The UAV of claim 6, wherein the application processing circuit is further configured to verify or authenticate a source of the received signal.

9. The UAV of claim 6, wherein the application processing circuit is further configured to assess a risk of the one or more signals.

10. The UAV of claim 1, wherein the flight control circuit is configured as a backup component in case the application processing circuit fails.

11. The UAV of claim 1, wherein the application processing circuit is located on a first printed circuit board, and the flight control circuit is located on a second printed circuit board.

12. The UAV of claim 11, further comprising:
an image processing circuit located on a third printed circuit board.

13. The UAV of claim 1, wherein the flight control circuit and the application processing circuit are coupled to different sensors on board the UAV.

14. The UAV of claim 1, wherein:
the real-time sensing circuit is further configured to receive the system image from the application processing circuit.

15. The UAV of claim 14, wherein the real-time sensing circuit is further configured to verify the validity of the system image.

16. The UAV of claim 15, wherein the flight control circuit is configured to prevent flight of the UAV prior to verification of the validity of the imaging system by both the application processing circuit and the real-time sensing circuit.

17. The UAV of claim 1, wherein the flight control circuit is further configured to use the processed primary image data to control the UAV to perform a waypoint flight function.

18. The UAV of claim 1, wherein the flight control circuit is further configured to use the processed secondary image data to control the UAV to perform vision based hovering.

19. A non-transitory computer readable medium for managing flight of an unmanned aerial vehicle (UAV), the non-transitory computer readable medium storing code, logic, or instructions to:
verify, at an application processing circuit, a validity of a system image of the UAV in a secure environment, the system image of the UAV including a state of the UAV that includes a state of an operating system of the UAV; and
prevent, at a flight control circuit operably coupled to the application processing circuit, generation and/or transmission of control signals from the flight control circuit to one or more electronic speed controllers (ESC controllers) prior to verification of the validity of the system image;
receive primary image data from a primary imaging sensor carried by a gimbal of the UAV;
process, at the application processing circuit, the primary image data;
receive secondary image data from a secondary imaging sensor, the secondary imaging sensor being not carried by the gimbal;
process, at a real-time sensing circuit coupled to the secondary imaging sensor and the flight control circuit, the secondary image data in a real time manner; and
at the flight control circuit:
receive the processed primary image data from the application processing circuit through a first communication channel, and use the processed primary image data to control the UAV to perform a tracking function; and
receive the processed secondary image data from the real-time sensing circuit through a second communication channel, and use the processed secondary image data to control the UAV to perform a passive autonomous flight based;
wherein the first communication channel is independent from the second communication channel.

20. A method for managing flight of an unmanned aerial vehicle (UAV), comprising:
verifying, at an application processing circuit, a validity of a system image of the UAV in a secure environment, the system image of the UAV including a state of the UAV that includes a state of an operating system of the UAV; and
preventing, at a flight control circuit operably coupled to the application processing circuit, generation and/or transmission of control signals from the flight control circuit to one or more electronic speed controllers (ESC controllers) prior to verification of the validity of the system image;
receiving primary image data from a primary imaging sensor carried by a gimbal of the UAV;
processing, at the application processing circuit, the primary image data;
receiving secondary image data from a secondary imaging sensor, the secondary imaging sensor being not carried by the gimbal;
processing, at a real-time sensing circuit coupled to the secondary imaging sensor and the flight control circuit, the secondary image data in a real time manner; and
at the flight control circuit:
receiving the processed primary image data from the application processing circuit through a first communication channel, and using the processed primary image data to control the UAV to perform a tracking function; and
receiving the processed secondary image data from the real-time sensing circuit through a second communication channel, and using the processed secondary image data to control the UAV to perform a passive autonomous flight;
wherein the first communication channel is independent from the second communication channel.

* * * * *